United States Patent
Ikeda

(10) Patent No.: US 6,295,409 B1
(45) Date of Patent: Sep. 25, 2001

(54) DISK APPARATUS

(75) Inventor: Kenichi Ikeda, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/052,105

(22) Filed: Mar. 31, 1998

(30) Foreign Application Priority Data

Mar. 31, 1997 (JP) .................................................. 9-080560
Mar. 31, 1997 (JP) .................................................. 9-080566

(51) Int. Cl.[7] ........................... H04N 5/781; H04N 5/783
(52) U.S. Cl. ............................................. 386/125; 386/124
(58) Field of Search ...................................... 386/124, 125, 386/126, 105, 106, 109, 111, 112, 46, 64, 45, 27, 33, 38, 107, 117; H04N 5/781, 5/783

(56) References Cited

U.S. PATENT DOCUMENTS

| | | | |
|---|---|---|---|
| 5,140,437 | * | 8/1992 | Yonemitsu et al. .................. 386/109 |
| 5,432,769 | * | 7/1995 | Honjo ....................................... 369/60 |
| 5,881,203 | * | 3/1999 | Fujinami et al. ....................... 386/96 |
| 6,115,536 | * | 9/2000 | Iwasaki et al. ....................... 386/106 |

* cited by examiner

*Primary Examiner*—Robert Chevalier
(74) *Attorney, Agent, or Firm*—Pillsbury Winthrop LLP

(57) ABSTRACT

A disk apparatus includes buffer memories and a controller for performing control to time-divisionally and alternately write data in two recording areas at different radial positions on an optical disk. Input two-channel digital video data are alternately written in the buffer memories at the bit rate of the video data. The video data stored in the buffer memories are read out at a rate twice the average bit rate or more and written in the optical head by an optical head.

20 Claims, 6 Drawing Sheets

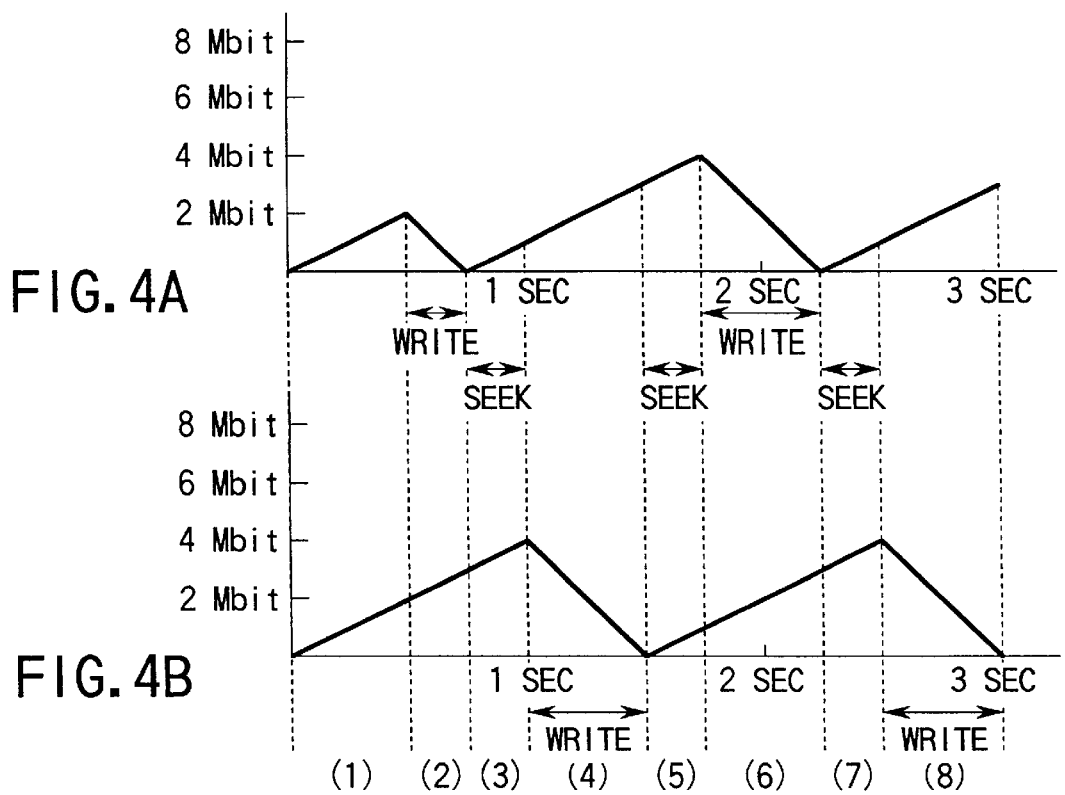
FIG. 4A
FIG. 4B
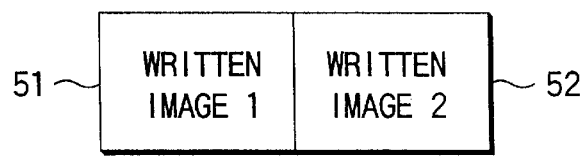
FIG. 5
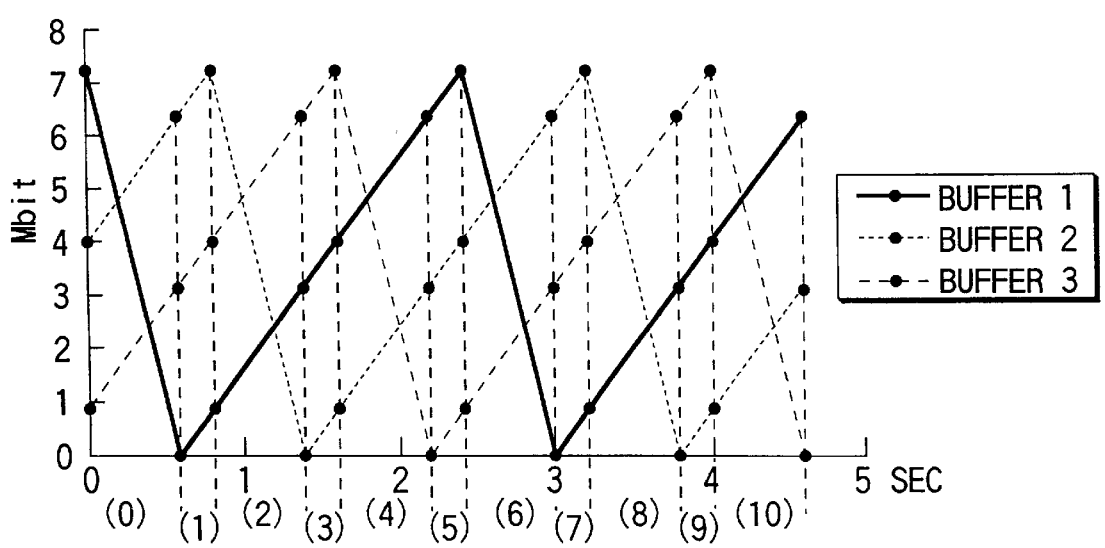
FIG. 6

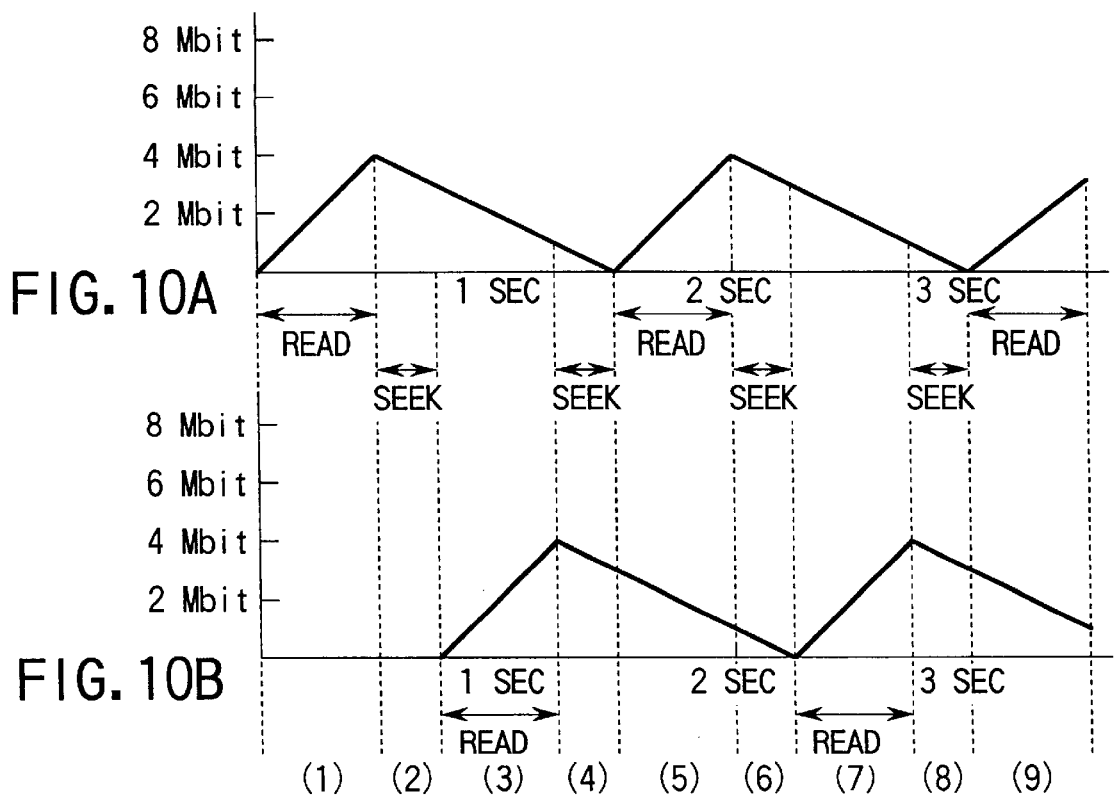
FIG. 10A
FIG. 10B
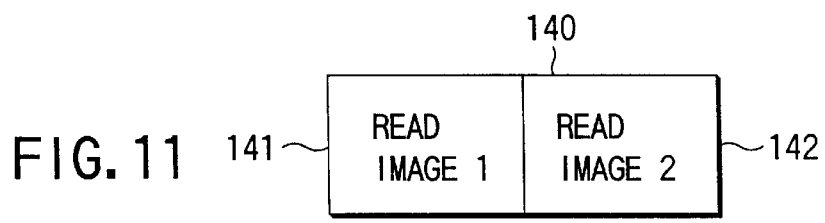
FIG. 11
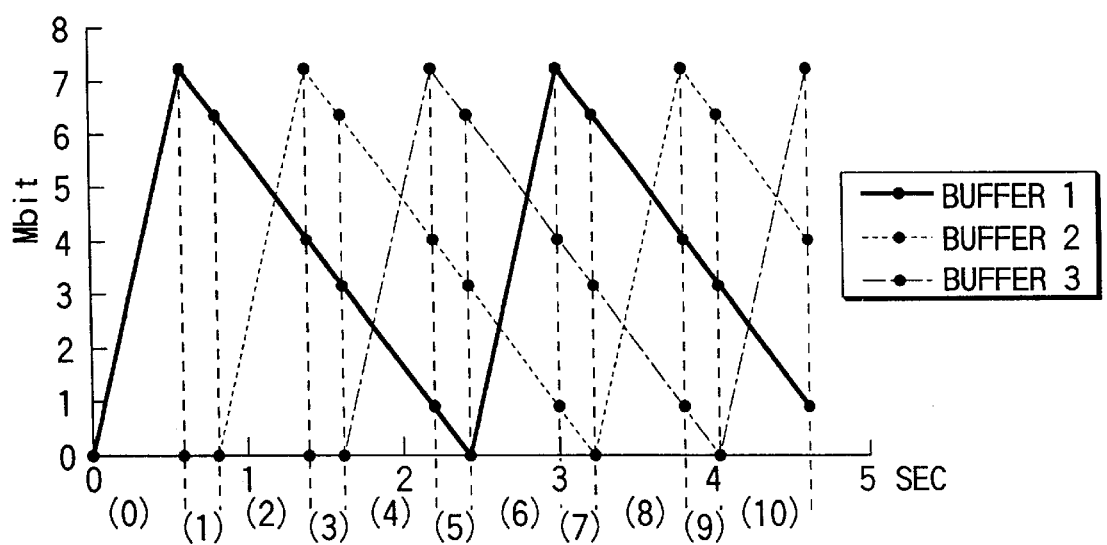
FIG. 12

DISK APPARATUS

BACKGROUND OF THE INVENTION

The present invention relates to a video disk apparatus for writing/reading digital continuous data and specifically, digital video data and, more particularly, to a disk apparatus having the function of time-divisionally and alternately writing and reading digital video images on a plurality of channels.

A video disk apparatus for writing/reading digital video data on/from a storage medium such as an optical disk by using a digital video compression technique represented by MPEG is under development.

According to a conventional video disk apparatus using an optical disk, the digital video data compressed by an MPEG encoder serving as a digital video compressor or digital video data transmitted from a broadcast station, a CATV (cable TV), or the like is temporarily stored in a buffer memory at a predetermined bit rate. This buffer memory is used for adjusting the difference between the bit rate of input digital video data (the number of bits transmitted per second) and the write/read speed of an optical disk (the number of bits which can be written/read per second). In general, the bit rate of input digital video data is lower than the write/read speed of the optical disk.

Digital video data is written in the optical disk as follows. The digital video data is read out from the buffer memory at the write speed of the optical disk first. The data is then modulated into a signal suited for a write by a modulator/demodulator section. The signal is input to the optical head. The digital video data is written in the optical disk by this optical head.

Digital video data is read from the optical disk as follows. The optical head is moved to a radial position, on the optical disk, in which the digital video data of a desired video image is written. The digital video data is then read from the optical disk by the optical head. The read digital video data undergoes demodulation which is a reverse process to that in the write operation. The resultant data is input to the buffer memory. The data is sent from this buffer memory to an MPEG decoder serving as a digital video decompressor at the bit rate of the digital video data to be decompressed. The decompressed video data is input to a monitor to be displayed as a video image.

As, for example, the number of channels to be distributed increases, demands have arisen for the use of such a video disk apparatus, as one of usage patterns, in writing video images on a plurality of channels in the same time zone. The above conventional video disk apparatus, however, can write only one-channel digital video data at once. To write digital video data on a plurality of channels at once, a plurality of video disk apparatuses must be prepared. As a result, the user must bear a high cost and ensure an installation space.

Analog video recording/reproduction apparatuses capable of writing two-channel video images at once are commercially available. In such a conventional analog video recording/reproduction apparatus, however, the recording band per video image must be reduced, and hence a deterioration in image quality is inevitable.

As described above, according to the conventional techniques, a plurality of video disk apparatuses must be prepared to write video,images on a plurality of. channels in the same time zone. As a result, the user must bear a high cost and ensure a large installation space. When two-channel video images are to be written at once by an analog video recording/reproduction apparatus, since the recording band per video image is reduced, the image quality deteriorates.

BRIEF SUMMARY OF THE INVENTION

It is an object of the present invention to provide a single disk apparatus which can simultaneously write digital video data such as digital video images on a plurality of channels without any deterioration in image quality.

According to the present invention, there is provided a disk apparatus for alternately and time-divisionally writing digital video data on a plurality of channels in a plurality of recording areas at different radial positions on a disk-like recording medium such as an optical disk through a buffer memory by using the difference between the write speed of the recording medium and the bit rate of continuous data such as digital video data.

According to the present invention, there is provided a disk apparatus comprising a head unit for writing digital continuous data on a disk-like recording medium, a buffer memory for temporarily storing a plurality of input digital continuous data, and a control section for performing control to time-divisionally write the plurality of digital continuous data in a plurality of different recording areas at different radial positions on the recording medium, wherein the control section writes, while one type of data of the digital continuous data is written and the head unit is accessing between the recording areas, another type of input data of the digital continuous data in the buffer memory, writes, in the buffer memory, one type of data of the digital continuous data input while another type of data of the digital continuous data is written and the head unit is accessing between the recording areas, reads out digital continuous data from the buffer memory and writes the data in a corresponding one of the recording areas at a write speed not less than two times an average bit rate of the input digital continuous data while another type of data of the digital continuous data is written, and reads out digital continuous data from the buffer memory at a write speed not less than two times an average bit rate of the input digital continuous data and writes the data in a corresponding one of the recording areas while one type of data of the digital continuous data is written in the recording area.

According to the present invention, a video disk apparatus for writing/reading digital continuous data such as digital video data on/from a disk-like recording medium by using a write/read head includes first and second buffer memories for temporarily storing first and second input digital continuous data, respectively, and a control section for time-divisionally and alternately writing the first and second digital continuous data in first and second recording areas at different radial positions on the recording medium, respectively.

In this case, the control section performs the following control:

(a) writing, in the first buffer memory, the first digital continuous data which is input while the second digital continuous data is written and the write/read head is accessing between the first and second recording areas;

(b) writing, in the second buffer memory, the second digital continuous data which is input while the first digital continuous data is written and the write/read head is accessing between the first and second recording areas;

(c) reading out, in writing the first digital continuous data, the digital continuous data stored in the first buffer memory at a write speed two times or more the average bit rate of the first input digital continuous data, and writing the data in the first recording area; and (d) reading out, in writing the second digital continuous data, the digital continuous data stored in the second buffer memory at a write speed two times or more the average bit rate of the second input digital continuous data, and writing the data in the second recording area.

The write speed for the first digital continuous data is set to $(T1+T2+2S)*A/T1$ bps or more, and the write speed for the second digital continuous data is set to $(T1+T2+2S)*A/T2$ bps or more when the average write time per write of the first digital continuous data is T1 sec in time-divisionally and alternately writing the first and second digital continuous data in the first and second recording areas, the average write time per write of the second digital continuous data is T2 sec, the maximum access time (a time obtained by adding the time required for one revolution of the recording medium to the seek time required for the head unit to move from the innermost circumference to the outermost circumference of the recording medium) is S sec, and the average bit rate of the first and second input digital continuous data is A bps.

According to the video disk apparatus having the above arrangement according to the present invention, this single apparatus can simultaneously write digital continuous data on a plurality of channels without any deterioration in image quality. The reason will be described below.

Assume that the average bit rate of digital continuous data is A bps, and the maximum access time (the time obtained by adding the time required for one revolution of the recording medium to the time required for the write/read head to move from the innermost circumference to the outermost circumference of the recording medium) is S sec. In this case, to simultaneously write the first and second digital continuous data in the first and second recording areas at different radial positions by using the single write/read head, the data must be written in the recording medium time-divisionally at a speed higher than the average bit rate of the two-channel digital continuous data. More specifically, the first and second digital continuous data are respectively written in the first and second recording areas in different time intervals. To process these two-channel digital continuous data at the average bit rate A (bps), therefore, the write/read speed of the recording medium must be at least $2*A$ bps or more.

In addition, since the single write/read head is used, and the first and second recording areas are located at different radial positions on the recording medium, there is an access time between the first and second recording areas in switching the first and second digital continuous data. Assume that two-channel digital continuous data are to be simultaneously written by repeating the following time-divisional sequence: "write of first digital continuous data in T1-sec interval"→"access from first recording area to second recording area in S-sec interval"→"write of second digital continuous data in T2-sec interval"→"access from second recording area to first recording area in S-sec interval". In this case, two accesses are performed between the recording areas in one cycle of this time-divisional sequence.

Since the first digital continuous data input in a $(T1+T2+2S)$-sec interval is written in a T1-sec interval, the write speed of the recording medium becomes $(T1+T2+2S)*A/T1$ bps or more. Similarly, when the second digital continuous data is to be written, the write speed of the recording medium becomes $(T1+T2+2S)*A/T2$ bps or more. When T1=T2, the write speed of the recording medium becomes $(2+2S/T1)*A$ bps or more. In this case, $2S/T1*A$ bps correspond to the write speed increase required for two accesses.

The required buffer memory capacities will be described next. The capacity required for the first buffer memory is obtained by multiplying the sum of two times the access time (the time required for the write/read head to reciprocate between the first recording area and second recording area) and an average write time T2 for the second digital continuous data by the average transfer rate of digital continuous data. That is, the required capacity is $(2S+T2)*A$ bits or more. Similarly, the capacity required for the second buffer memory is obtained by multiplying the sum of two times the access time (the time required for the write/read head to reciprocate between the second recording area and the first recording area) and an average write time T1 for the first digital continuous data by the average transfer rate of digital continuous data. That is, the required capacity is $(2S+T1)*A$ bits or more. The total capacity required for the first and second buffer memories is $(4S+T1+T2)*A$ bits or more.

Assume that these conditions for the write speed of the recording medium and the buffer memory capacities are satisfied. In this case, when the first digital continuous data is to be written, the first input digital continuous data to be written is stored in the first buffer memory while the write/read head is moved from the first recording area to the second recording area to make access thereto in S sec to write the second digital continuous data for an average write time of T2 sec, and the write/read head is moved, in S sec, from the second recording area to a radial position of the first recording area, in which data is to be continuously written. In the next average T1-sec interval, the first digital continuous data is read out from the first buffer memory and written in the first recording area.

Similarly, when the second digital continuous data is to be written, the second input digital continuous data to be written is stored in the second buffer memory while the write/read head is moved from the second recording area to the first recording area to make access thereto in S sec to write the first digital continuous data for an average write time of T1 sec, and the write/read head is moved, in S sec, from the first recording area to a radial position of the second recording area, in which data is to be continuously written. In the next average T2-sec interval, the second digital continuous data is read out from the second buffer memory and written in the second recording area.

By repeating these operations, the first and second digital continuous data can be simultaneously written in the first and second recording areas, respectively, by using the single write/read head.

When two-channel video images are to be simultaneously recorded by using the conventional analog video recording/reproduction apparatus, the recording band per video image must be reduced. In contrast to this, according to the present invention, since digital continuous data on a plurality of channels are recorded in different recording areas on a recording medium, the recording band need not be reduced. Therefore, no deterioration in the quality of continuous data occurs.

Assume that when a seek failure occurs, a seek is to be retried. In this case, it suffices if the write speeds for the first and second digital continuous data are respectively set to $(T1+T2+2*S (N+1))*A/T1$ bps or more and $(T1+T2+2*S (N+1))*A/T2$ bps or more, and the total storage capacity of the first and second buffer memories is set to $(4*S*(N+1)+T1+T2)*A$ bits or more when the average write time per write of the first digital continuous data in time-divisionally and alternately writing the first and second digital continuous data in the first and second recording areas is T1 sec, the average read time per read of the second digital continuous data is T2 sec, the maximum access time for the recording medium (the time obtained by adding the time required for one revolution of the recording medium to the seek time required for the write/read head to move from the innermost circumference to the outermost circumference of the recording medium) is S sec, the average bit rate of the first and second digital continuous data is A bps, and the maximum number of retries upon occurrence of a seek failure is N.

In addition, the display screen of the display unit is divided to simultaneously display an image based on the first digital continuous data written in the first recording area and an image based on the second digital continuous data written in the second recording area, thereby allowing the user to simultaneously check the two-channel digital continuous data.

According to the present invention, there is provided a disk apparatus for alternately and time-divisionally reading digital video data on a plurality of channels from a plurality of reproduction areas at different radial positions on a disk-like recording medium such as an optical disk through a buffer memory by using the difference between the read speed of the recording medium and the bit rate of input digital video data.

According to the present invention, a video disk apparatus for writing/reading digital video data on/from a disk-like recording medium by using a write/read head includes first and second buffer memories for temporarily storing first and second digital video data read from first and second recording areas at different radial positions on the recording medium and a control section for time-divisionally and alternately reading the first and second digital video data.

In this case, the control section performs the following control:

(a) reading the first digital video data to be read, in advance, from the first recording area at a read speed two times or more the average bit rate of the first digital video data and writing the data in the first buffer memory while the second digital video data is read and the write/read head is accessing between the first and second recording areas.

(b) reading the second digital video data to be read, in advance, from the second recording area at a read speed two times or more the average bit rate of the second digital video data and writing the data in the second buffer memory while the first digital video data is read and the write/read head is accessing between the first and second recording areas.

(c) reading out, in reading the first digital video data, the digital video data stored in the first buffer memory at the bit rate of the first digital video data; and (d) reading out, in reading the second digital video data, the digital video data stored in the second buffer memory at the bit rate of the second digital video data.

The read speed for the first digital video data is set to (T1+T2+2S)*A/T1 bps or more, and the read speed for the second digital video data is set to (T1+T2+2S)*A/T2 bps or more when the average read time per read of the first digital video data is T1 sec in time-divisionally and alternately reading the first and second digital video data from the first and second recording areas, the average read time per read of the second digital video data is T2 sec, the maximum access time (the time obtained by adding the time required for one revolution of the recording medium to the seek time required for the head unit to move from the innermost circumference to the outermost circumference of the recording medium) is S sec, and the average bit rate of the first and second digital video data is A bps.

According to the video disk apparatus having the above arrangement according to the present invention, this single apparatus can simultaneously read digital video data on a plurality of channels. The reason will be described below.

Assume that the average bit rate of digital video data is A bps, and the maximum access time (the time obtained by adding the time required for one revolution of the recording medium to the time required for the write/read head to move from the innermost circumference to the outermost circumference of the recording medium) is S sec. In this case, to simultaneously read the first and second digital continuous data in the first and second recording areas at different radial positions by using the single write/read head, the data must be read from the recording medium time-divisionally at a speed higher than the average bit rate of the two-channel digital video data. More specifically, the first and second digital video data are respectively read from the first and second recording areas in different time intervals. To process these two-channel digital video data at the average bit rate A (bps), therefore, the write/read speed of the recording medium must be at least 2*A bps or more.

In addition, since the single write/read head is used, and the first and second recording areas are located at different radial positions on the recording medium, there is an access time between the first and second recording areas in switching the first and second digital video data. Assume that two-channel digital video data are to be simultaneously read by repeating the following time-divisional sequence: "read of first digital video data in T1-sec interval"→"access from first recording area to second recording area in S-sec interval"→"read of second digital video data in T2-sec interval"→"access from second recording area to first recording area in S-sec interval". In this case, two accesses are performed between the recording areas in one cycle of this time-divisional sequence.

When the first digital video data is to be read, the first digital video data corresponding to a (T1+T2+2S)-sec interval is read from the recording medium in a T1-sec interval. The read speed of the recording medium therefore becomes (T1+T2+2S)*A/T1 bps or more. Similarly, when the second digital video data is to be read, the read speed of the recording medium becomes (T1+T2+2S)*A/T2 bps or more. When T1=T2, the read speed of the recording medium becomes (2+2S/T1)*A bps or more. In this case, 2S/T1*A bps correspond to the read speed increase required for two accesses.

The required buffer memory capacities will be described next. The capacity required for the first buffer memory is obtained by multiplying the sum of two times the access time (the time required for the write/read head to reciprocate between the first recording area and second recording area) and an average read time T2 for the second digital video data by the average transfer rate of digital video data. That is, the required capacity is (2S+T2)*A bits or more. Similarly, the capacity required for the second buffer memory is obtained by multiplying the sum of two times the access time (the time required for the write/read head to reciprocate between the second recording area and the first recording area) and an average read time T1 for the first digital video data by the average transfer rate of digital video data. That is, the required capacity is (2S+T1)*A bits or more. The total capacity required for the first and second buffer memories is (4S+T1+T2)*A bits or more.

Assume that these conditions for the read speed of the recording medium and the buffer memory capacities are satisfied. In this case, when the first digital video data is to be read, the first digital video data to be read is read for an average read time of T1 sec and written in the first buffer memory while the write/read head is moved from the first recording area to the second recording area to make access thereto in S sec to read the second digital video data for an average read time of T2 sec, and the write/read head is moved, in S sec, from the second recording area to a radial position of the first recording area, from which data is to be continuously read.

Similarly, when the second digital video data is to be read, the second digital video data to be read is stored in the second buffer memory while the write/read head is moved from the second recording area to the first recording area to make access thereto in S sec to read the first digital video data for an average read time of T1 sec, and the write/read head is moved, in S sec, from the first recording area to a radial position of the second recording area, from which data is to be continuously read. The second digital video data is read for a next average read time of T2 sec, and written in the second buffer memory.

When no data is to be read from the recording medium, the first and second digital video data are read out from the first and second buffer memories at the bit rate of the digital video data. For example, the read data are decompressed by a digital video decompressor. The resultant data are then output to the display unit.

By repeating these operations, the first and second digital video data can be simultaneously read from the first and second recording areas, respectively, by using the single write/read head.

Assume that when a seek failure occurs, a seek is to be retried. In this case, it suffices if the read speeds for the first and second digital video data are respectively set to (T1+T2+2*S (N+1))*A/T1 bps or more and (T1+T2+2*S (N+1))*A/T2 bps or more, and the total storage capacity of the first and second buffer memories is set to (4*S*(N+1)+T1+T2)*A bits or more when the average read time per read of the first digital video data in time-divisionally and alternately reading the first and second digital video data from the first and second recording areas is T1 sec, the average read time per read of the second digital video data is T2 sec, the maximum access time for the recording medium (the time obtained by adding the time required for one revolution of the recording medium to the seek time required for the write/read head to move from the innermost circumference to the outermost circumference of the recording medium) is S sec, the average bit rate of the first and second digital video data is A bps, and the maximum number of retries upon occurrence of a seek failure is N.

In addition, the display screen of the display unit is divided to simultaneously display an image based on the first digital video data read from the first recording area and an image based on the second digital video data read from the second recording area, thereby allowing the user to simultaneously check the two-channel digital video data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinbefore.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 4A and 4B are graphs showing changes in the amounts of digital video data in the first and second buffer memories in this embodiment;

FIG. 5 is a view showing a display example in this embodiment;

FIG. 6 is a graph showing changes in the amounts of digital video data in the first, second, and third buffer memories in this embodiment;

FIGS. 10A and 10B are graphs showing changes in the amounts of digital video data in the first and second buffer memories in this embodiment;

FIG. 11 is a view showing a display example in this embodiment; and

FIG. 12 is a graph showing changes in the amounts of digital video data in the first, second, and third buffer memories in this embodiment.

DETAILED DESCRIPTION OF THE INVENTION

Figure 1:
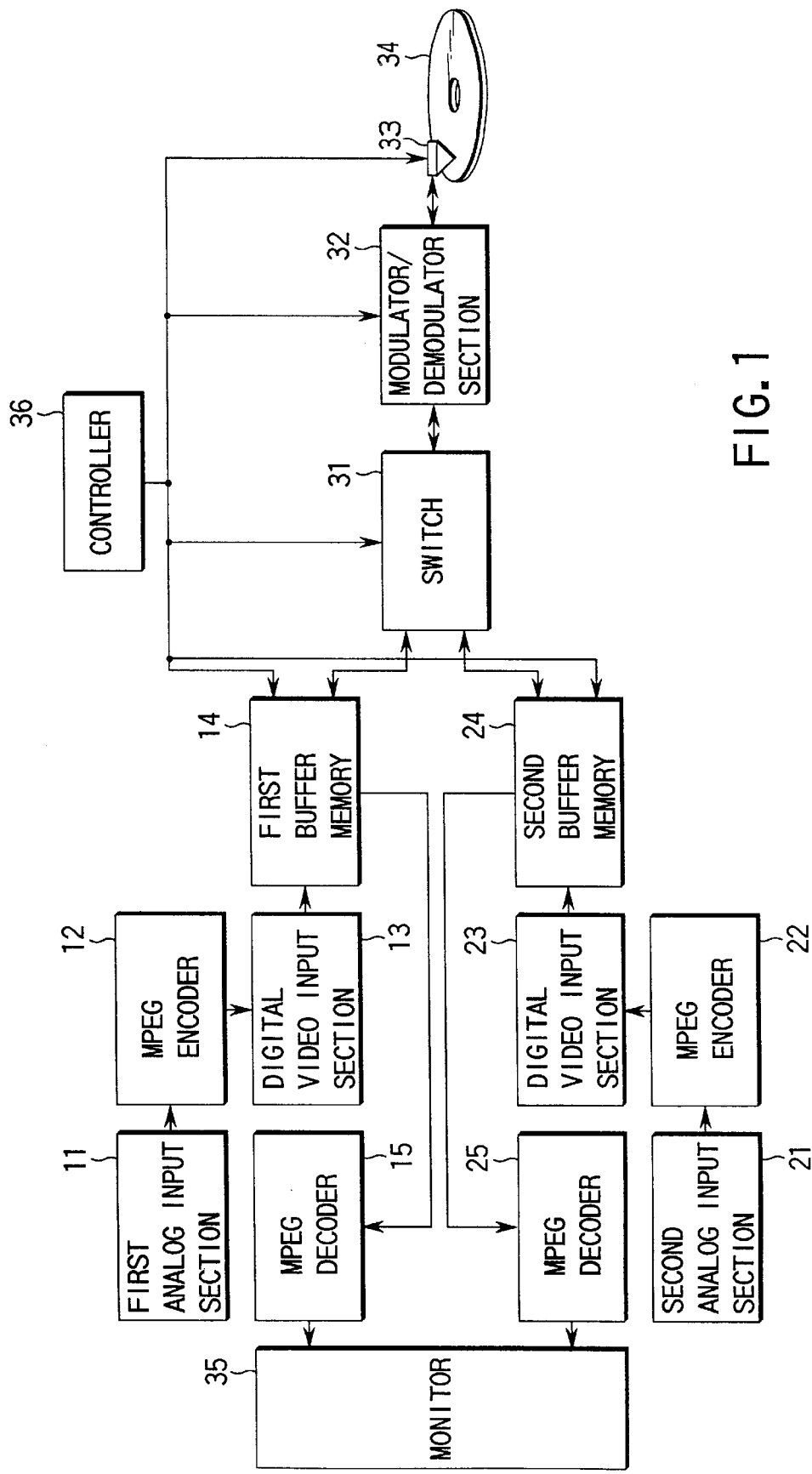
FIG. 1 is a block diagram showing the arrangement of a video disk apparatus according to an embodiment of the present invention.

FIG. 1 shows the arrangement of a disk apparatus, and more specifically, a video disk apparatus used to write/read digital continuous data. This video disk apparatus is constituted by analog input sections 11 and 21, MPEG encoders 12 and 22 as digital video data compressors, digital video input sections 13 and 23, first and second buffer memories 14 and 24, MPEG decoders 15 and 25 as digital video data decompressors, a switch 31, a modulator/demodulator section 32, an optical head 33, an optical disk 34, a monitor 35 for displaying a read image, and a controller 36 for controlling the respective components.

The operation of this embodiment will be described below.

Figure 2:
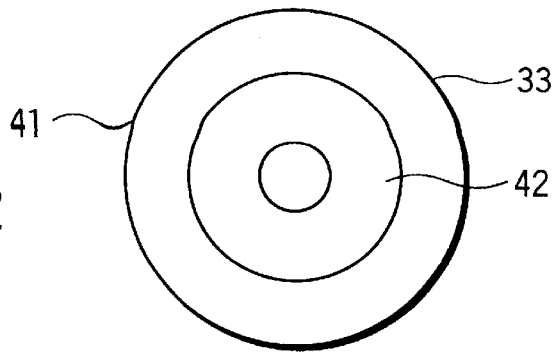
FIG. 2 is a view showing the first and second recording areas on an optical disk in this embodiment.

Assume that digital video data are distributed from the MPEG encoders 12 and 22, a CATV, a satellite broadcast station, and the like at an average bit rate of 4 Mbps in the following description. Assume also that digital video data are written/read on/from the optical disk 34 at a write/read speed (data transfer rate) of 12 Mbps. In addition, as shown in FIG. 2, the optical disk 34 has first and second recording areas 41 and 42 located at different positions in the radial direction. Each of the first and second buffer memories 14 and 24 has a capacity of 6 Mbits.

In the following operation, a write of data on the optical disk 34 by the optical head 33, the write/read operations of the first and second buffer memories 14 and 24, and switching control on the switch 31, and the like are performed under the control of the controller 36.

The process of writing one-channel digital video data will be described first.

If an input video data signal is an analog video signal such as an NTSC signal, the analog video signal is input to the analog input section 11 or 21 and subjected to analog/digital conversion and image compression in the MPEG encoder 12 or 22. The resultant data is input to the digital video input section 13 or 23. In contrast to this, compressed digital video data transmitted from a CATV, a satellite broadcast station, or the like is directly input to the digital video input section 13 or 23.

A case wherein first digital video data is input from the digital video input section 13 will be described first.

The first digital video data input from the digital video input section 13 is written in the first buffer memory 14 at, e.g., a rate of 4 Mbps. When a certain amount of digital video data is written in the buffer memory 14, the digital video data is read out from the buffer memory 14 at a rate of 12 Mbps, which is the write speed of the optical disk 34. The read data is input to the switch 31. In this case, the switch 31 is switched by the controller 36 such that the digital video data from the first buffer memory 14 is input to the modulator/demodulator section 32 when the first digital video data is to be written, and the digital video data from the second buffer memory 24 is input to the modulator/demodulator section 32 when the second digital video data is to be written.

The digital video data input to the modulator/demodulator section 32 is modulated into a signal suited for a write. This signal is input to the known optical head 33 mainly constituted by a semiconductor laser, an objective, a photoelectric detector, and the like (none of which are shown). The signal is then written in the optical disk 34 by the optical head 33. The optical disk 34 is a rewritable medium, and more specifically, a phase change recording medium, a magneto-optic recording medium, or the like.

Since the write speed of the optical disk 34 is higher than the bit rate of digital video data, the buffer memory 14 sometimes becomes empty. In this case, a write on the optical disk 34 is interrupted, and the processing is repeated from the operation of storing digital video data in the buffer memory 14. Therefore, digital video data is continuously input to the buffer memory 14, but the digital video data is intermittently written in the optical disk 34 by intermittently reading out the digital video data from the buffer memory 14.

Assume that when digital video data is stored in the buffer memory 14 up to 4 Mbits or more, a write on the optical disk 34 is started. In this case, when digital video data is stored in the buffer memory 14 up to 4 Mbits, the digital video data is read out from the buffer memory 14 at a rate of 12 Mbps while digital video data from the digital video input section 13 is written in the buffer memory 14 at a rate of 4 Mbps. Consequently, the buffer memory 14 becomes empty in about 4 Mbits/(12 Mbps−4 Mbps)=0.5 sec, and the write on the optical disk 34 is interrupted. The buffer memory 14 is filled to 4 Mbits in the next one sec, and the data is written in the optical disk 34 again.

A case wherein the first and second digital video data are simultaneously written in the optical disk 34, which is a characteristic operation of the present invention, will be described next. As described above, a write on the optical disk 34 is interrupted in some intervals in the process of writing the first digital video data. The second digital video data can be written in the optical disk 34 by using such intervals.

The second digital video data input from the digital video input section 23 is processed in the same manner as the first digital video data. In addition, the first and second digital video data are processed concurrently. The second digital video data is written in the optical disk 34 through the second buffer memory 24, the switch 31, the modulator/demodulator section 32, and the optical head 33.

In this case, as shown in FIG. 2, the first recording area 41, in which the first digital video data is written, and the second recording area 42, in which the second digital video data is written, are located at different radial positions on the optical disk 34. The optical head 33 therefore needs to move, i.e., access, between the recording areas 41 and 42. The first and second digital video data input during this access between the recording areas 41 and 42 are respectively stored in the buffer memories 14 and 24.

Figure 3:
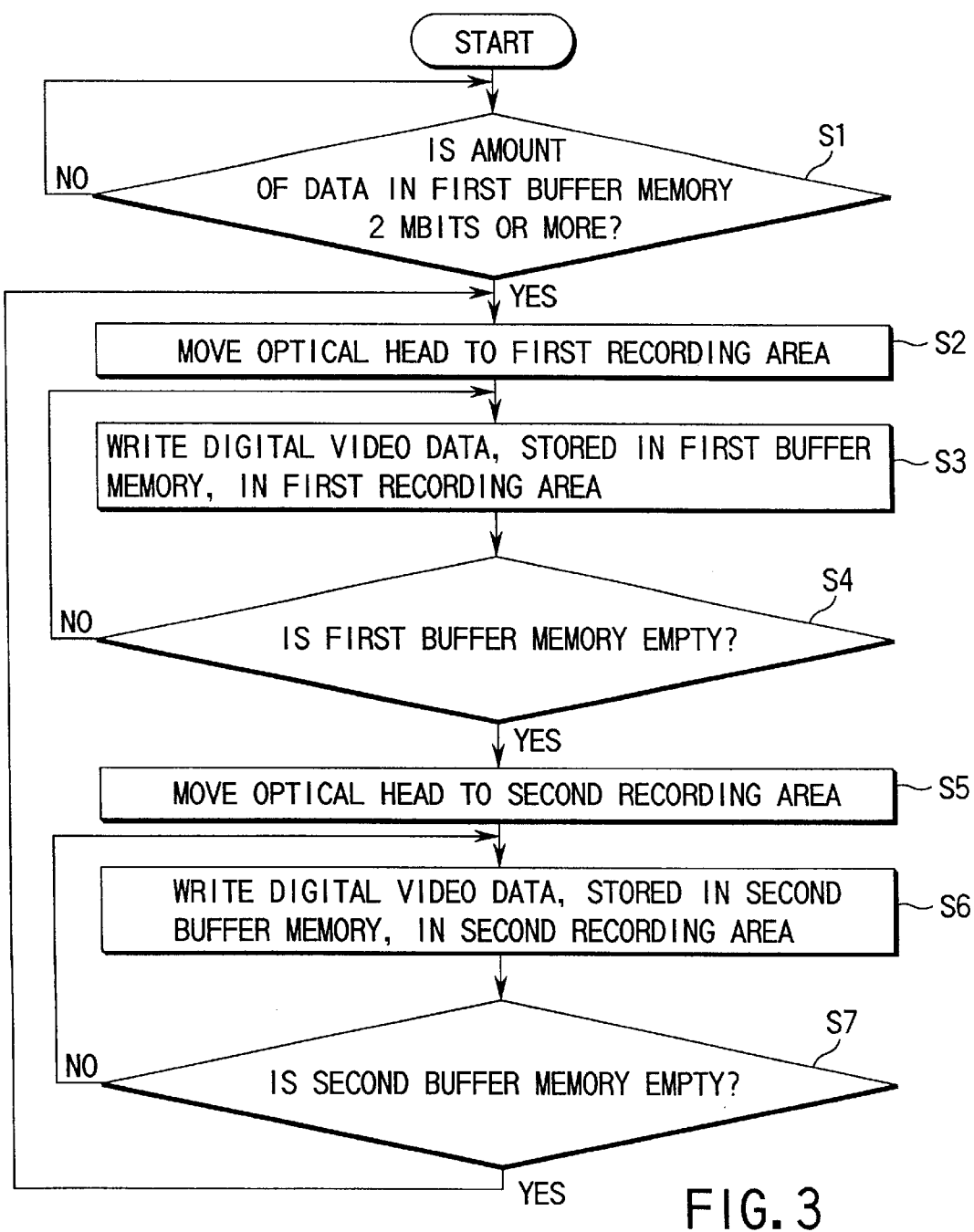
FIG. 3 is a flow chart showing a sequence for simultaneously writing the first and second digital video data in this embodiment.

FIG. 3 is a flow chart showing a sequence for simultaneously writing the first and second digital video data on the disk in this embodiment.

First of all, it is checked whether digital video data is stored in the first buffer memory 14 up to 2 Mbits or more (step S1). If it is determined that digital video data is stored in the first buffer memory 14 up to 2 Mbits or more, the optical head 33 is moved to the first recording area 41 on the optical disk 34 (step S2). The first digital video data is read out from the buffer memory 14 and written in the first recording area 41 until the buffer memory 14 become empty (steps S3 and S4).

The optical head 33 is moved to the second recording area 42 on the optical disk 34 (step S5). The second digital video data is then read out from the second buffer memory 24 and written in the second recording area 42 until the buffer memory 24 becomes empty (steps S6 and S7).

Subsequently, the flow returns to step S2 to alternately repeat a write of the first digital video data in the first recording area 41 on the optical disk 34 and a write of the second digital video data in the second recording area 42.

FIGS. 4A and 4B are graphs showing changes in the amounts of digital video data in the first and second buffer memories 14 and 24 with time in the process of simultaneously writing the first and second digital video data on the disk. Assume that the average access time between the first and second recording areas 41 and 42 is 0.25 sec, and the optical head 33 is located in the first recording area 41. A sequence of a simultaneous write in this embodiment will be described below.

(1) In the first 0.5-sec interval, no data is written, and hence 4 Mbits*0.5 sec=2 Mbits of digital video data is stored in each of the first and second buffer memories 14 and 24.

(2) In the next 0.25-sec interval, the first digital video data stored in the first buffer memory 14 is read out at a rate of 12 Mbps and written in the first recording area 41 on the optical disk 34. As a result, the amount of first digital video data left in the first buffer memory 14 becomes 2 Mbits−(12 Mbps−4 Mbps)*0.25 sec=0. At this time, since the second digital video data stored in the second buffer memory 24 is not written in the optical disk, the amount of second digital video data in the buffer memory 24 is 2 Mbits+4 Mbps*0.25 sec=3 Mbits.

(3) In the next 0.25-sec interval, the optical head 33 is moved from the first recording area 41 to the second recording area 42 to make access thereto. Since no data is written in the optical disk 34 during this access, the amount of first digital video data in the first buffer memory 14 is 4 Mbps*0.25 sec=1 Mbits, and the amount of second digital video data in the second buffer memory 24 is 3 Mbits+4 Mbps*0.25 sec=4 Mbits.

(4) In the next 0.5-sec interval, the second digital video data stored in the second buffer memory 24 is written in the optical disk 34 at a rate of 12 Mbps. As a result, the amount of second digital video data left in the second buffer memory 24 becomes 4 Mbits−(12 Mbps)*0.5 sec=0. At this time, since the first digital video data stored in the first buffer memory 14 is not written in the optical disk 34, the amount of first digital video data in the first buffer memory 14 is 1 Mbits+4 Mbps*0.5 sec=3 Mbits.

(5) In the next 0.25-sec interval, the optical head 33 is moved from the second recording area 42 to the first recording area 41 to make access thereto. Since no data is written in the optical disk 34 during this access, the amount of first digital video data in the first buffer memory 14 is 3 Mbits+4 Mbps*0.25 sec=4 Mbits, and the amount of second digital video data in the second buffer memory 24 is 4 Mbps*0.25 sec=1 Mbits.

(6) In the next 0.5-sec interval, the first digital video data stored in the first buffer memory 14 is written in the optical disk 34 at a rate of 12 Mbps. As a result, the amount of first digital video data left in the first buffer memory 14 becomes 4 Mbits=(12 Mbps−4 Mbps)*0.5 sec=0. At this time, since the second digital video data stored in the second buffer memory 24 is not written in the optical disk 34, the amount of second digital video data in the second buffer memory 24 is 1 Mbits+4 Mbps*0.5 sec=3 Mbits.

Subsequently, the following operations are repeated: access of the optical head 33 from the first recording area 41 to the second recording area 42 (0.25 sec)→write of the second digital video data in the second recording area 42→access of the optical head 33 from the second recording area 42 to the first recording area 41 (0.25 sec)→write of first digital video data in the first recording area 41 (0.5 sec).

As is obvious from FIGS. 4A and 4B, both the amounts of first and second digital video data stored in the first and second buffer memories 14 and 24 do not exceed the buffer memory capacity, and the first and second digital video data are alternately written in the optical disk 34.

The required write speed of the optical disk 34 in the present invention will be described next.

In this embodiment, the average bit rate of the first and second digital video data is A=4 Mbps, and the maximum access time for the optical disk 34 (the time obtained by adding the time required for one revolution of the optical disk 34 to the seek time required for the optical head 33 to move from the innermost circumference to the outermost circumference of the optical disk 34) is S=0.25 sec.

To simultaneously write the first and second digital video data in the first and second recording areas 41 and 42 on the optical disk 34 by using the optical head 33, the two-channel digital video data must be time-divisionally and alternately written in the disk at a speed higher than the average bit rate of the two-channel digital video data. That is, the first digital video data is written in some intervals, while the second digital video data is written in other intervals. To process the two-channel digital video data at an average bit rate of 4 Mbps, therefore, the write speed of the optical disk 34 must be set to at least 2*4 Mbps=8 Mbps.

In addition, since the single optical head 33 is used, and the positions of the first and second recording areas 41 and 42 on the optical disk 34 are not necessarily the same, an access time is required to switch between writes in the recording areas 41 and 42. Assume that a write operation is performed by repeating the following time-divisional sequence: "write of first digital video data in first recording area 41"→"access from first recording area 41 to second recording area 42"→"write of second digital video data in second recording area 42". In this case, two accesses are performed in one time-divisional sequence.

In a write operation, therefore, digital video data input in an average write time of 0.5 sec for digital video data written in the optical disk 34, and the time taken for two accesses must be written within this write time.

Referring to FIGS. 4A and 4B, the average write time required for the first digital video data per write operation is about 0.5 sec, although the write time is 0.25 sec only for the first time, and the average write time for the second digital video data is also 0.5 sec. The average access time is 0.25 sec. It therefore suffices if the write speed of the optical disk 34 is (0.5+0.5+2*0.25)*4 Mbps/0.5 sec=12 Mbps or more. In this case, 4 Mbps corresponds to the write speed increase required for two accesses. In this embodiment, the write/read speed of the optical disk 34 is 12 Mbps, which satisfies this condition.

The buffer memory capacity required in the present invention will be described next.

The capacity required for the first buffer memory 14 is obtained by multiplying the sum of two times the maximum access time S (the time required for the optical head 33 to reciprocate between the first recording area 41 and the second recording area 42) and an average write time T2 for the second digital video data by the average transfer rate of digital video data. That is, the required capacity is (2S+T2)*A bits or more. In this case, the required capacity is (2*0.25+0.5)*4=4 Mbits or more.

Similarly, the capacity required for the second buffer memory 24 is obtained by multiplying the sum of two times the maximum access time (the time required for the optical head 33 to reciprocate between the second recording area 42 and the first recording area 41) and an average write time T1 for the first digital video data by the average transfer rate of digital video data. That is, the required capacity is (2S+T1)*A bits or more. In this case, the required capacity is (2*0.25+0.5)*4=4 Mbits or more.

A total buffer memory capacity of 8 Mbits or more is therefore required for the first and second buffer memories 14 and 24. In this embodiment, since each of the first and second buffer memories 14 and 24 has a capacity of 6 Mbits, the total capacity is 12 Mbits. Hence, this condition is satisfied.

Referring to FIGS. 4A and 4B, however, a maximum of only 4 Mbits of each of the first and second buffer memories 14 and 24 are used. That is, a capacity of 4 Mbits is sufficient for each memory buffer. The capacity of each of the buffer memories 14 and 24 can therefore be reduced to 4 Mbits by some techniques concerning memory control.

Assume that the above conditions for the write speed of the optical disk 34 and the buffer memory capacity are satisfied. In this case, the recording system for the first digital video data stores, in the first buffer memory 14, the first digital video data to be written in the interval during which the optical head 33 makes access from the first recording area 41 to the second recording area 42 to write the second digital video data for an average write time of 0.5 sec, and the optical head 33 makes access from the second recording area 42 to a radial position of the first recording area 41, in which data is to be continuously written, and reads out the digital video data from the first buffer memory 14 and writes it onto the optical disk 34 in the next 0.5-sec interval.

The recording system for the second digital video data stores, in the second buffer memory 24, the second digital video data to be written in the interval during which the optical head 33 makes access from the second recording area 42 to the first recording area 41 to write the first digital video data for an average write time of 0.5 sec, and the optical head 33 makes access from the first recording area 41 to a radial position of the second recording area 42, in which data is to be continuously written, and reads out the digital video data from the second buffer memory 24 and writes it onto the optical disk 34 in the next 0.5-sec interval.

With this operation, the first and second digital video data can be simultaneously written in the first and second recording areas 41 and 42 at different radial positions on the optical disk 34 by using one optical head 33.

FIG. 5 shows a display example on the monitor 35 in this embodiment. The display screen of the monitor 35 is divided into two areas, in which a written image 51 based on the first digital video data and a written image 52 based on the second digital video data are separately and simultaneously displayed, thereby allowing the user to simultaneously monitor the two written images 51 and 52.

When this monitor display is to be performed, in this embodiment, the first and second digital video data read out from the buffer memories 14 and 24 are decompressed by the MPEG decoders 15 and 25 first, and then are output to the monitor 35. If, however, the input video signals are analog signals, the signals may be directly input to the monitor 35 without the mediacy of the MPEG encoders 12 and 22, the digital video input sections 13 and 23, and the MPEG decoders 15 and 25.

If, for example, address information written in the optical disk 34 cannot be read, the optical head 33 cannot be moved, i.e., sought, from a given recording area to another recording area on the optical disk 34. When such a seek failure occurs, the video disk apparatus of this embodiment repeats the seek up to a predetermined number of retries. Letting A (bps) be the bit rate of digital video data, S (sec) be the maximum access time for the optical disk 34 (the time obtained by adding the time required for one revolution of the optical disk 34 to the seek time required for the optical head 33 to move from the innermost circumference to the outermost circumference of the optical disk 34), and N be the maximum number of retries upon occurrence of a seek failure, the maximum seek time is set to (N+1)*S sec to estimate the write speed of the optical disk 34 and the capacities of the buffer memories 14 and 24 in consideration of retries upon occurrence of this seek failure.

If, therefore, the write speeds for the first and second digital video data are (T1+T2+2*S*(N+1))*A/T1 bps or more and (T1+T2+2*S*(N+1))*A/T2 bps or more, respectively, and the total storage capacity of the buffer memories 14 and 24 is (4*S*(N+1)+T1+T2)*A bits or more, the digital video data as re-seek targets can be stored in the buffer memories 14 and 24 even in the process of retrying seeking of the optical head 33, thereby allowing the digital video data to be written without any interruption.

In the above embodiment, the two-channel digital video data are simultaneously written. A case wherein three-channel digital video data are simultaneously written will be described next.

To simultaneously write three digital video images by using one write/read head, the three digital video images must be time-divisionally written in the disk at a speed higher than the average bit rate of the three digital video images. Video images 1, 2, and 3 are respectively written in the disk in different time intervals. To process the three video images, a write/read speed of the disk must be 3*A bit/s or more. In addition, since the single write/read head is used, and the positions of the respective recording areas on the disk are not necessarily the same, an access time is required to switch between writes in the respective recording areas. Assume that a write operation is performed by repeating the following time-divisional sequence: "write for T1 sec"→"access from recording area 1 to recording area 2 in S sec"→"write for T2 sec"→"access from recording area 2 to recording area 3 in S sec"→"write for T3 sec"→"access from recording area 3 to recording area 1 in S sec". In this case, three accesses are performed in one time-divisional sequence.

When the first video image is to be written, therefore, the digital video data input in (T1+T2+T3+3*S) sec is written in the disk in T1 sec. Consequently, the write speed for the first video image is (T1+T2+T3+3*S)*A/T1 bps or more. Similarly, the write speed for the second video image is (T1+T2+T3+3*S)*A/T2 bps or more. The write speed for the third video image is (T1+T2+T3+3*S)*A/T3 bps or more.

The required buffer memory capacity is the value obtained by multiplying the sum of three times the access time (the time required for the optical head to reciprocate between recording area 1, recording area 2, and recording area 3) and the time required to write the two remaining video images by the average transfer rate of the video images. The respective buffer memory capacities required for the first to third video images are (3*S+T2+T3)*A bits or more, (3S+T1+T3)*A bits or more, and (3*S+T1+T2)*A bits or more, respectively. A total of (9*S+T1+2*T2+2*T3)*A bits or more is required.

If these conditions for the write/read speed of the disk and the buffer capacities are satisfied, the digital video image to be written is stored in each buffer memory while three accesses are made and two remaining video images are written in the disk. The video data in each buffer memory is written in the disk in a corresponding write interval. By repeating these operations, the transferred digital video data are continuously written in the optical disk without any omission.

FIG. 6 shows changes in the digital video data in the buffer memories corresponding to the respective video images with time in the process of simultaneously writing the three video images. The three buffer memories are prepared for the respective video images. In addition, the average bit rate of the video data is set to A=4 Mbits/s; the maximum access time, S=0.2 sec; and T1=T2=T3, 0.6 sec.

The write speed required to simultaneously write the three video images is (T1+T2+T3+3*S) A/T1=16 Mbits/s or more. The capacity required for each buffer memory is (3*S+T1+T2)*A 7.2 Mbits. The total required capacity of three buffer memories 1, 2, and 3 is 7.2*3=21.6 Mbits. These three buffer memories 1, 2, and 3 respectively correspond to video images 1, 2, and 3.

(0) In the first 0.6-sec interval, video data 1 is sent to buffer memory 1 at a rate of 4 Mbits/s while 7.2-Mbit video data in buffer memory 1 is written in the disk at a rate of 16 Mbits/s. The amount of data in buffer memory therefore becomes 7.2 Mbits−(16−4)*0.6=0.

Meanwhile, only video data 2 is sent to buffer memory 2, in which 4-Mbit video data is stored, at a rate of 4 Mbit/s.

The amount of data in buffer 2 therefore becomes 4 Mbits+4*0.6=6.4 Mbit.

Meanwhile, only video data 3, in which 0.8-Mbit video data 3 is stored, is sent to buffer memory 3 at a rate of 4 Mbits/s. The amount of data in buffer 3 therefore becomes 0.8 Mbits+4*0.6=3.2 Mbits.

(1) In the next 0.2-sec interval, since a seek is performed from the recording area for video data 1 to the recording area for video data 2, video data are stored in the respective buffer memories. As a result, the amount of data in each buffer memory increases by 4 Mbits*0.2=0.8 Mbits. That is, the amounts of data in buffer memories 1, 2, and 3 respectively become 0+0.8=0.8 Mbits, 6.4+0.8=7.2 Mbits, and 3.2+0.8=4 Mbits.

(2) In the next 0.6-sec interval, only video data 1 is set to buffer memory 1, in which 0.8-Mbit video data 1 is stored, at a rate of 4 Mbits/s. The amount of data in buffer memory 1 therefore becomes 0.8 Mbit+4*0.6=3.2 Mbits. Meanwhile, video data 2 is set to buffer memory 2 at a rate of 4 Mbits/s while 7.2-Mbit video data in buffer memory 2 is written in the disk at a rate of 16 Mbits/s. As a result, the amount of data in buffer memory 2 becomes 7.2 Mbits (16−4)*0.6=0.

Meanwhile, only video data 3 is sent to buffer memory 3, in which 4-Mbit video data 3 is stored, at a rate of 4 Mbits/s. The amount of data in buffer memory 3 therefore becomes 4 Mbits+4*0.6=6.4 Mbits.

(3) In the next 0.2-sec interval, since a seek is performed from the recording area for video data 2 to the recording area for video data 3, video data are stored in the respective buffer memories. As a result, the amount of data in each buffer memory increases by 4 Mbits*0.2=0.8 Mbits. That is, the amounts of data in buffer memories 1, 2, and 3 respectively become 3.2+0.8=4 Mbits, 0+0.8=0.8 Mbits, and 6.4+0.8=7.2 Mbits.

(4) In the next 0.6-sec interval, only video data 1 is sent to buffer memory 1, in which 0.8-Mbit video data 1 is stored, at a rate of 4 Mbits/s. The amount of data in buffer memory 1 therefore becomes 4 Mbits*4* 0.6=6.4 Mbits. Meanwhile, only video data 2 is sent to buffer memory 2, in which 0.8-Mbit video data 2 is stored, at a rate of 4 Mbits/s. As a result, the amount of data in buffer memory 2 becomes 0.8 Mbits+4*0.6=3.2 Mbits. Meanwhile, video data 3 is sent to buffer memory 3 at a rate of 4 Mbits/s while 7.2-Mbit video data 3 in buffer memory 3 is written in the disk at a rate of 16 Mbits/s. As a result, the amount of data in buffer memory 3 becomes 7.2 Mbits−(16−4)*0.6=0.

(5) In the next 0.2-sec interval, since a seek is performed from the recording area for video data 3 to the recording area for video data 1, video data are stored in the respective buffer memories. The amount of data in each buffer memory increases by 4 Mbits/s*0.2=0.8 Mbits. That is, the amounts of data in buffer memories 1, 2, and 3 respectively become 6.4+0.8=7.2 Mbits, 3.2+0.8=4 Mbits, and 0+0.8=0.8 Mbits.

(6) In the next 0.6-sec interval, video data 1 is sent to buffer memory 1 at a rate of 4 Mbits/s while 7.2-Mbit video data 1 in buffer memory 1 is written in the disk at a rate of 16 Mbits/s. The amount of data in buffer memory 1 therefore becomes 7.2 Mbits−(16−4)*0.6=0.

Meanwhile, only video data 2 is sent to buffer memory 2, in which 4-Mbit video data 2 is stored, at a rate of 4 Mbits/s. As a result, the amount of data in buffer memory 1 becomes 4 Mbits+4*0.6=6.4 Mbits.

Meanwhile, only video data 2 is sent to buffer memory 2, in which 0.8-Mbit video data 3 is stored, at a rate of 4 Mbits/s. As a result, the amount of data in buffer memory 3 becomes 0.8 Mbits+4*0.6=3.2 Mbits.

(7) In the next 0.2-sec interval, since a seek is performed from the recording area for video data 1 to the recording area for video data 2, video data are stored in the respective buffer memories. The amount of data in each buffer memory increases by 4 Mbits/s*0.2=0.8 Mbits. That is, the amounts of data in buffer memories 1, 2, and 3 respectively become 0+0.8=0.8 Mbits, 6.4+0.8=7.2 Mbits, and 3.2+0.8=4 Mbits.

(8) In the next 0.6-sec interval, only video data 1 is sent to buffer memory 1, in which 0.8-Mbit video data 1 is stored, at a rate of 4 Mbits/s.

The amount of data in buffer memory 1 therefore becomes 0.8 Mbits+4*0.6=3.2 Mbits. Meanwhile, video data 2 is sent to buffer memory 2 at a rate of 4 Mbits/s while 7.2-Mbit video data 2 in buffer memory 2 is written in the disk at a rate of 16 Mbits/s. As a result, the amount of data in buffer memory 1 becomes (7.2 Mbits−16−4)3*0.6=0.

Meanwhile, only video data 3 is sent to buffer memory 3, in which 4-Mbit video data 3 is stored, at a rate of 4 Mbits/s. As a result, the amount of data in buffer memory 3 becomes 4 Mbits+4*0.6 6.4 Mbits.

(9) In the next 0.2-sec interval, since a seek is performed from the recording area for video data 2 to the recording area for video data 3, video data are stored in the respective buffer memories. The amount of data in each buffer memory increases by 4 Mbits/s*0.2 0.8 Mbits. That is, the amounts of data in buffer memories 1, 2, and 3 respectively become 3.2+0.8=4 Mbits, 0+0.8=0.8 Mbits, and 6.4+0.8=7.2 Mbits.

(10) In the next 0.6-sec interval, only video data 1 is sent to buffer memory 1, in which 0.8-Mbit video data 1 is stored, at a rate of 4 Mbits/s. The amount of data in buffer memory 1 therefore becomes 4 Mbits+4*0.6=6.4 Mbits. The amount of data in buffer memory 2, in which 0.8-Mbit video data 2 is stored, becomes 0.8 Mbits+4*0.6=3.2 Mbits. Meanwhile, video data 3 is sent to buffer memory 3 while 7.2-Mbit video data 3 in buffer memory 3 is written in the disk at a rate of 16 Mbits/s. As a result, the amount of data in buffer memory 3 becomes 7.2 Mbits−(16−4)*0.6.

Subsequently, operations (5), (6), (7), (8), (9), and (10) are repeated.

As described above, the digital video data to be written is stored in each buffer memory while three accesses are performed, and two remaining video data are written in the disk. The video data in each buffer memory is written in the disk in a corresponding write interval. By repeating these operations, the transferred digital video data are continuously written in the optical disk without any omission.

In the above embodiment, two- and three-channel digital video data are simultaneously written in the disk. However, the present invention can also be applied to a simultaneous write of n-channel (n>3) digital video data.

In this case, n-channel digital video data are written in n recording areas located at different radial positions on an optical disk at T-sec intervals. Since n T-sec writes and n seeks (accesses) are performed in one time-divisional sequence, the required write speed is (n*T+nS)*A/T bps or more, and the required buffer memory capacity is (n*nS+nT)*A bits or more. As is obvious from the gist of the present invention, n-channel input digital video data can be written without any interruption under these conditions.

In this embodiment, semiconductor memories on different chips may be used as the first and second buffer memories 14 and 24. Alternatively, a large-capacity semiconductor memory on one chip may be divided into two address spaces, and the first and second digital video data may be respectively stored in the two addresses spaces.

As described above, according to the present invention, digital video data on a plurality of channels can be written in one video disk apparatus without degrading image quality by alternately and time-divisionally writing different digital video data in a plurality of recording areas located at different radial positions on a disk-like recording medium using a single write/read head.

More specifically, in the above embodiment, the write speed of the recording medium is set to higher than the bit rate obtained by adding the access time required for the write/read head to reciprocate between the first and second recording areas to the total bit rate of the first and second digital video data. In addition, the recording system for the first digital video data includes the first buffer memory having a capacity enough to store the first digital video data input in the interval during which the second digital video data is written and the write/read head reciprocates (accesses) between the first and second recording areas. The recording system for the second digital video data includes the second buffer memory having a capacity enough to store the second digital video data input in the interval during which the first digital video data is written and the write/read head reciprocates (accesses) between the first and second recording areas. With this arrangement, the first and second input digital video data can be continuously and simultaneously written in the recording medium by the single write/read head without any omission.

Figure 7:
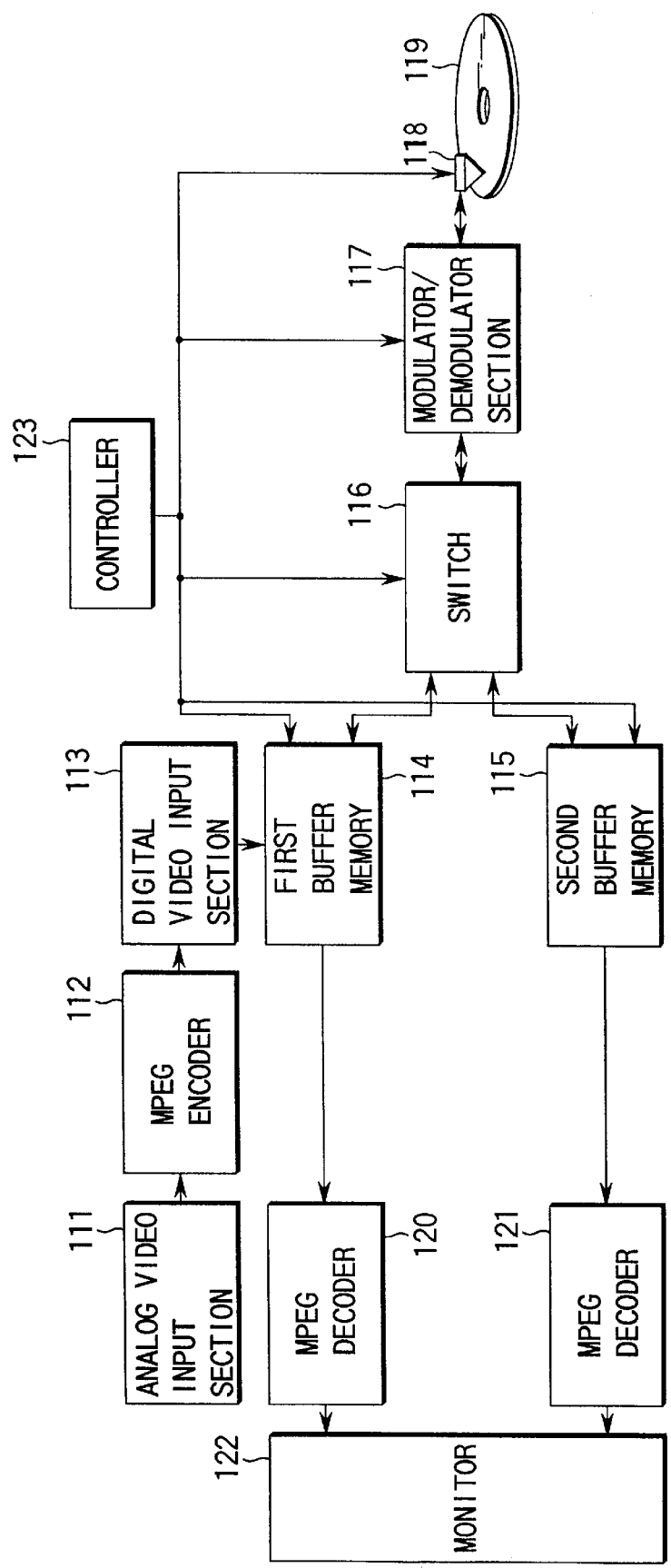
FIG. 7 is a block diagram showing the arrangement of a video disk apparatus according to another embodiment of the present invention.

FIG. 7 shows the arrangement of a video disk apparatus according to another embodiment of the present invention. This video disk apparatus is constituted by a first/second analog video input section 111, an MPEG encoder 112 as a digital video data compressor, a digital video input section 113, first and second buffer memories 114 and 115, a switch 116, a modulator/demodulator section 117, an optical head 118, an optical disk 119, MPEG decoders 120 and 121 as digital video data decompressors for monitoring images, a monitor 122 for displaying read images, and a controller 123 for controlling the respective components.

The operation of this embodiment will be described below.

Figure 8:
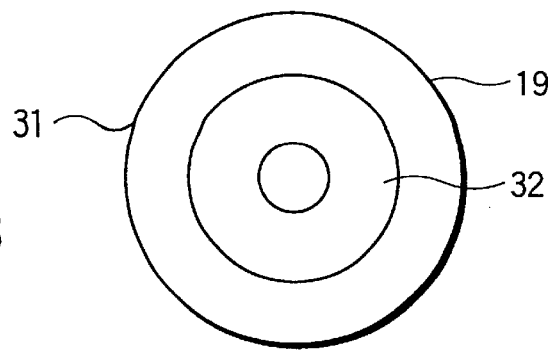
FIG. 8 is a view showing the first and second recording areas on an optical disk in this embodiment.

Assume that digital video data are transmitted from the MPEG encoder 112, a CATV, a satellite broadcast station, and the like at an average bit rate of 4 Mbps in the following description. Assume also that digital video data are written/read on/from the optical disk 119 at a write/read speed (data transfer rate) of 112 Mbps. In addition, as shown in FIG. 8, the optical disk 119 has first and second recording areas 131 and 132 located at different positions in the radial direction. Each of the first and second buffer memories 114 and 115 has a capacity of 6 Mbits.

In the following operation, a read of data from the optical disk 119 by the optical head 118, the write/read operations of the first and second buffer memories 114 and 115, and switching control on the switch 116, and the like are performed under the control of the controller 123.

Since the write operation of this embodiment is substantially the same as that of the preceding embodiment, the read operation will be described below.

A general process of reading one-channel digital video data will be described first. Assume that the first digital video data written in the first recording area 131 on the optical disk 119 is to be read.

The signal read from the first recording area 131 on the optical disk 119 by the optical head 118 is demodulated into the first digital video data by the modulator/demodulator section 117. The demodulated digital video data is written in the buffer memory 114 at a rate of 112 Mbps. At the same time, digital video data is read out from the buffer memory 114 at a rate of 4 Mbps, decompressed by the MPEG decoder 120, and output to the monitor 122.

Since the read speed of the optical disk 119 is higher than the bit rate of digital video data, the buffer memory 114 may be filled to capacity. In this case, a read is interrupted until the digital video data stored in the buffer memory 114 decreases to a certain amount. That is, digital video data are continuously read out from the buffer memory 114, but digital video data is intermittently read from the optical disk 119.

Assume that a read of data from the optical disk 119 is performed when the digital video data stored in the buffer memory 114 decreases to 2 Mbits or less. In this case, digital video data is read out from the buffer memory 114 at a rate of 4 Mbps and input to the MPEG decoder 120 while digital video data is written in the buffer memory 114 at a rate of 12 Mbps. The amount of data in the buffer memory 114 becomes 2 Mbits+(12 Mbps−4 Mbps)*0.5 sec=6 Mbits, i.e., the buffer memory 114 is filled to capacity, in about 0.5 sec. The read is therefore interrupted. Since the amount of data in the buffer memory 114 becomes 2 Mbits in the next 1-sec interval, digital video data is read from the optical disk 119 again.

In reading digital video data on a given channel, the read is interrupted in some intervals, and digital video data through another channel can be read by using these intervals.

The process of simultaneously reading the first and second digital video data from the optical disk 119 will be described next.

As described above, a read of the first digital video data from the optical disk 119 is interrupted in some intervals, and the second digital video data is read by using these intervals.

The second digital video data is read in the same manner as the first digital video data. The read signal read from the second recording area 132 on the optical disk 119 by the optical head 118 is demodulated into the second digital video data by the modulator/demodulator section 117. The data is written in the second buffer memory 115 through the switch 116. This data is decompressed by the MPEG decoder 121 and output to the monitor 122.

As shown in FIG. 8, the first recording area 131 in which the first digital video data is written and the second recording area 132 in which the second digital video data is stored are located at different radial positions on the optical disk 119. The optical head 118 must therefore be moved (for access) between the recording areas 131 and 132. As the first and second digital video data to be input to the MPEG decoders 120 and 121 during an access between the recording areas 131 and 132, the digital video data stored in the buffer memories 114 and 115 in advance are used.

Figure 9:
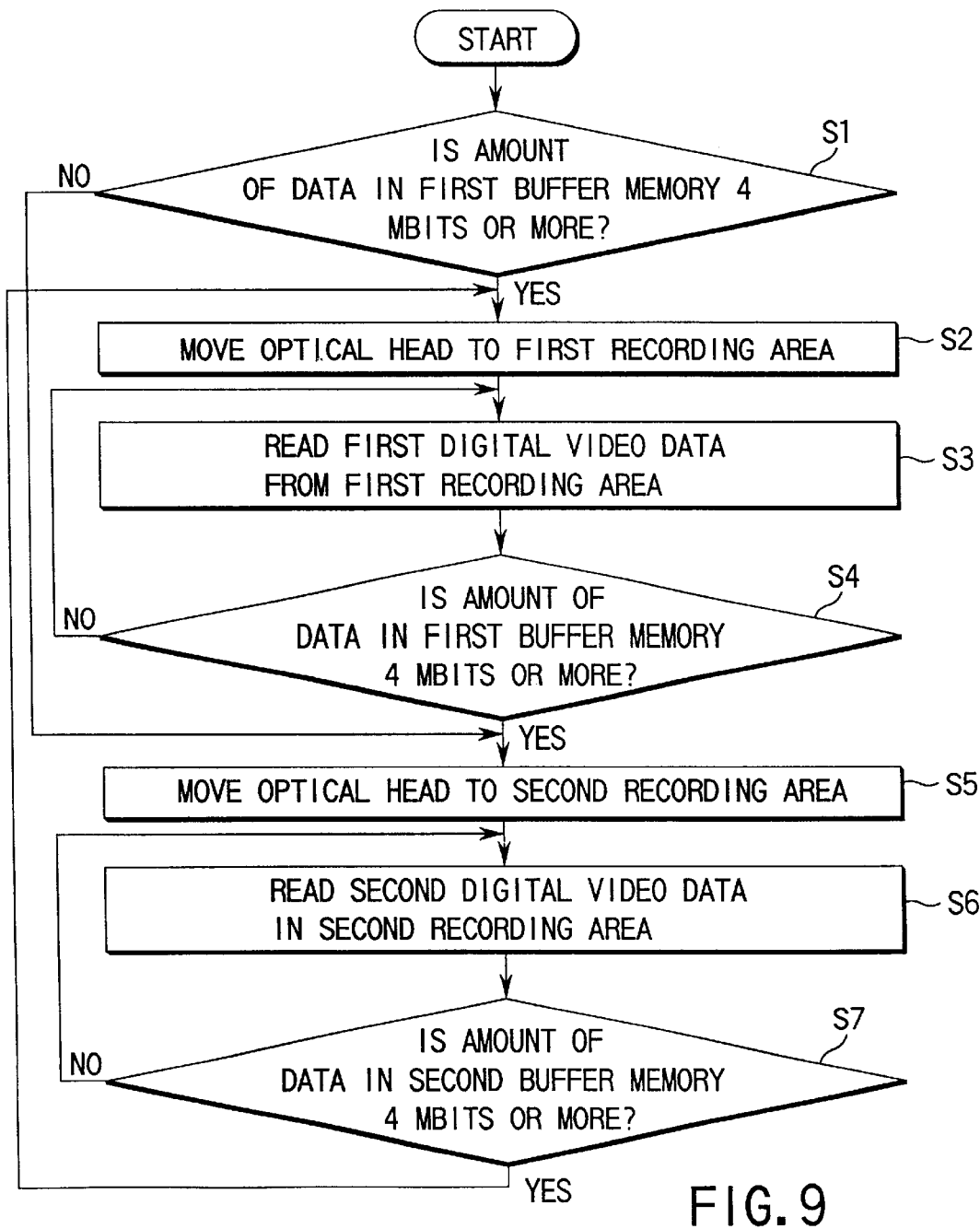
FIG. 9 is a flow chart showing a sequence for simultaneously reading the first and second digital video data in this embodiment.

FIG. 9 is a flow chart showing a sequence for simultaneously reading the first and second digital video data in this embodiment.

First of all, it is checked whether the first digital video data stored in the first buffer memory 114 is 4 Mbits or less (step S1). If it is determined that the digital video data stored in the first buffer memory 114 is 4 Mbits or less, the optical head 118 is moved to the first recording area 131 on the optical disk 119 (step S2). Digital video data is then read from the first recording area 131 and written in the buffer memory 114 until the amount of first digital video data in the buffer memory 114 becomes 4 Mbits or more (Steps S3 and S4).

The optical head 118 is moved to the second recording area 132 on the optical disk 119 (step S5). Digital video data is read from the second recording area 132 and written in the first and second buffer memory 115 until the amount of second digital video data in the second buffer memory 115 becomes 4 Mbits or more (steps S6 and S7).

Subsequently, the flow returns to step S2 to alternately repeat a read of the first digital video data from the first recording area 131 on the optical disk 119 and a read of the second digital video data from the second recording area 132.

FIGS. 10A and 10B show changes in the amounts of digital video data in the first and second buffer memories 114 and 115 with time in the process of simultaneously reading the first and second digital video data. Assume that an average access time between the first and second recording areas 131 and 132 is 0.25 sec. Assume also that the optical head 118 is located in the first recording area 131. A sequence for a simultaneous read in this embodiment will be described with reference to FIGS. 10A and 10B. Assume that no digital video data is initially stored in both the buffer memories 114 and 115.

(1) In the first 0.5-sec interval, while the first digital video data is read from the first recording area 131 on the optical disk 119 at a rate of 12 Mbps and written in the first buffer memory 114, the data is read out from the first buffer memory 114 at a rate of 4 Mbps and output to the MPEG decoder 120. As a result, the amount of first digital video data in the buffer memory 114 becomes (12 Mbps–4 Mbps)*0.5 sec 4 Mbits. Since no data is read from the second recording area 132 on the optical disk 119, the amount of data in the first buffer memory 115 remains zero.

(2) In the next 0.25-sec interval, the optical head 118 is moved from the first recording area 131 to the second recording area 132 to make access thereto. During this access, no data is read from the optical disk 119, and the first digital video data in the first buffer memory 114 is read out at a rate of 4 Mbps and output to the MPEG decoder 120. As a result, the amount of data in the first buffer memory 114 becomes 4 Mbits–4 Mbps*0.25 sec=3 Mbits. The amount of data in the second buffer memory 115 remains zero.

(3) In the next 0.5-sec interval, while the second digital video data is read from the second recording area 132 at a rate of 12 Mbps and written in the second buffer memory 115, the second digital video data is read out from the second buffer memory 115 at a rate of 4 Mbps and output to the MPEG decoder 121. As a result, the amount of second digital video data in the second buffer memory 115 becomes (12 Mbps–4 Mbps)*0.5 sec=4 Mbits. No data is read from the first recording area 131 on the optical disk 119, and the first digital video data in the first buffer memory 114 is read out at a rate of 4 Mbps and output to the MPEG decoder 120. The amount of data in the first buffer memory 114 therefore becomes 3 Mbits–4 Mbps*0.5 sec=1 Mbits.

(4) In the next 0.25-sec interval, the optical head 118 is moved from the second recording area 132 to the first recording area 131 to make access thereto. During this access, no data is read from the optical disk 119, and the first digital video data in the first buffer memory 114 is read out at a rate of 4-Mbps and output to the MPEG decoder 120. The amount of data in the first buffer memory 114 therefore becomes 1 Mbits–4 Mbps*0.25 sec=0. The second digital video data in the second buffer memory 115 is read out at a rate of 4 Mbps and output to the MPEG decoder 121. As a result, the amount of data in the second buffer memory 115 becomes 4 Mbits–4 Mbps*0.25 sec=3 Mbits.

(5) In the next 0.5-sec interval, while the first digital video data is read from the first recording area 131 at a rate of 12 Mbps and written in the first buffer memory 114, the first digital video data is read out from the first buffer memory 114 at a rate of 4 Mbps and output to the MPEG decoder 120. The amount of first digital video data in the first buffer memory 114 therefore becomes (12 Mbps–4 Mbps)*0.5 sec=4 Mbits. No data is read from the second recording area 132 on the optical disk 119, and the second digital video data in the second buffer memory 115 is read out at a rate of 4 Mbps and output to the MPEG decoder 121. The amount of data in the second buffer memory 115 therefore becomes 3 Mbits–4 Mbps*0.5 sec=1 Mbits.

(6) In the next 0.25-sec interval, the optical head 118 is moved from the first recording area 131 to the second recording area 132 to make access thereto. During this access, no data is read from the optical disk 119, and the first digital video data in the first buffer memory 114 is read out at a rate of 4 Mbps and output to the MPEG decoder 120. The amount of data in the first buffer memory 114 therefore becomes 4 Mbits–4 Mbps*0.25 sec=3 Mbits. The second digital video data in the second buffer memory 115 is read out at a rate of 4 Mbps and output to the MPEG decoder 121. The amount of data in the second buffer memory 115 therefore becomes 1 Mbits–4 Mbps*0.25 sec=0.

(7) In the next 0.25-sec interval, while the second digital video data is read from the second recording area 132 at a rate of 12 Mbps and written in the second buffer memory 115 at a rate of 4 Mbps, the second digital video data is read out from the second buffer memory 115 at a rate of 4 Mbps and output to the MPEG decoder 121. The amount of second digital video data in the second buffer memory 115 therefore becomes (12 Mbps–4 Mbps)*0.5 sec=4 Mbits. No data is read from the first recording area 131 on the optical disk 119, and the first digital video data in the first buffer memory 114 is read out at a rate of 4 Mbps and output to the MPEG decoder 120. The amount of data in the first buffer memory 114 therefore becomes 3 Mbits–4 Mbps*0.5 sec=1 Mbits.

Subsequently, the following operations are repeated: access of the optical head 118 from the first recording area 132 to the second recording area 131 (0.25 sec)→read of the first digital video data from the first recording area 131→access of the optical head 118 from the first recording area 131 to the second recording area 132 (0.25 sec)→read of second digital video data from the second recording area 132 (0.5 sec).

As is obvious from FIGS. 10A and 10B, both the amounts of first and second digital video data stored in the first and second buffer memories 114 and 115 do not exceed the buffer memory capacity, and the first and second digital video data are alternately read from the optical disk 119.

The required read speed of the optical disk 119 in the present invention will be described next.

In this embodiment, the average bit rate of the first and second digital video data is A=4 bps, and the maximum access time for the optical disk 119 (the time obtained by adding obtained by adding the time required for one revolution of the optical disk 119 to the seek time required for the optical head 118 to move from the innermost circumference to the outermost circumference of the optical disk 119) is S=0.25 sec.

To simultaneously read the first and second digital video data from the first and second recording areas 131 and 132 on the optical disk 119 by using the optical head 118, the two-channel digital video data must be time-divisionally and alternately read from the disk at a speed higher than the average bit rate of the two-channel digital video data. That is, the first digital video data is read in some intervals, while the second digital video data is read in other intervals. To process the two-channel digital video data at an average bit rate of 4 Mbps, therefore, the read speed of the optical disk 119 must be set to at least 2*4 Mbps=8 Mbps.

In addition, since the single optical head 118 is used, and the positions of the first and second recording areas 131 and 132 on the optical disk 119 are not necessarily the same, an access time is required to switch between reads from the recording areas 131 and 132. Assume that a read operation is performed by repeating the following time-divisional sequence: "read of first digital video data from first recording area 131"→"access from first recording area 131 to second recording area 132"→"read of second digital video data from second recording area 132"→"access from second recording area 132 to first recording area 131". In this case, two accesses are performed in one time-divisional sequence. In a read operation, therefore, the digital video data to be read in an average read time of 0.5 sec, during which digital video data is read from the optical disk 119, and the time taken for two accesses must be stored in a corresponding buffer memory in this read time.

Referring to FIGS. 10A and 10B, the average read time required for the first digital video data per read operation is about 0.5 sec, and the average read time for the second digital video data is also 0.5 sec. The average access time is 0.25 sec. It therefore suffices if the read speed of the optical disk 119 is (0.5+0.5+2*0.25)*4 Mbps/0.5 sec=12 Mbps or more. In this case, 4 Mbps corresponds to the read speed increase required for two accesses. In this embodiment, the read/read speed of the optical disk 119 is 12 Mbps, which satisfies this condition.

The buffer memory capacity required in the present invention will be described next.

The capacity required for the first buffer memory 114 is obtained by multiplying the sum of two times the maximum access time S (the time required for the optical head 118 to reciprocate between the first recording area 131 and the second recording area 132) and an average read time T2 for the second digital video data by the average transfer rate of digital video data. That is, the required capacity is (2S+T2)*A bits or more. In this case, the required capacity is (2*0.25+0.5)*4=4 Mbits or more.

Similarly, the capacity required for the second buffer memory 115 is obtained by multiplying the sum of two times the maximum access time (the time required for the optical head 118 to reciprocate between the second recording area 132 and the first recording area 131) and an average read time T1 for the first digital video data by the average transfer rate of digital video data. That is, the required capacity is (2S+T1)*A bits or more. In this case, the required capacity is (2*0.25+0.5)*4=4 Mbits or more.

A total buffer memory capacity of 8 Mbits or more is therefore required for the first and second buffer memories 114 and 115. In this embodiment, since each of the first and second buffer memories 114 and 115 has a capacity of 6 Mbits, the total capacity is 12 Mbits. Hence, this condition is satisfied.

Referring to FIGS. 10A and 10B, however, a maximum of only 4 Mbits of each of the first and second buffer memories 114 and 115 are used. That is, a capacity of 4 Mbits is sufficient for each memory buffer. The capacity of each of the buffer memories 114 and 115 can therefore be reduced to 4 Mbits by some techniques concerning memory control.

Assume that the above conditions for the read speed of the optical disk 119 and the buffer memory capacity are satisfied. In this case, in the reproduction system for the first digital video data, the first digital video data to be output to the MPEG decoder 120 is stored in advance in the first buffer memory 114 in an average read time of 0.5 sec for data from the optical disk 119 while the optical head 118 is moved (for access) from the first recording area 131 to the second recording area 132 to read the second digital video data in an average time of 0.5 sec, and the optical head 118 is moved from the second recording area 132 to a radial position of the first recording area 131, from which data is to be continuously read. When the optical head 118 is moved for access, and the second digital video data is read from the optical disk 119, this reproduction system reads out digital video data from the first buffer memory 114 and outputs it to the MPEG decoder 120, thereby reading images based on the first digital video data without any interruption.

In the reproduction system for the second digital video data, the second digital video data to be output to the MPEG decoder 121 is stored in advance in the second buffer memory 111 in an average read time of 0.5 sec for data from the optical disk 119 while the optical head 118 is moved (for access) from the second recording area 132 to the first recording area 131 to read the first digital video data in an average time of 0.5 sec, and the optical head 118 is moved from the first recording area 131 to a radial position of the second recording area 132, from which data is to be continuously read. When the optical head 118 is moved for access, and the first digital video data is read from the optical disk 119, this reproduction system reads out digital video data from the second buffer memory 115 and outputs it to the MPEG decoder 121, thereby reading images based on the second digital video data without any interruption.

With this operation, the first and second digital video data can be simultaneously read from the first and second recording areas 131 and 132 at different radial positions on the optical disk 119 by using one optical head 118.

In this embodiment, as shown in FIG. 11, a display screen 140 of the monitor 122 is divided into two areas, in which a read image 141 based on the first digital video data and a read image 141 based on the second digital video data are separately and simultaneously displayed, thereby allowing the user to simultaneously monitor the two-channel read images 141 and 142.

When this monitor display is to be performed, in this embodiment, the first and second digital video data read out from the buffer memories 114 and 115 are decompressed by the MPEG decoders 120 and 121 first, and then are output to the monitor 122. If, however, the input video signals are analog signals, the signals may be directly input to the monitor 122 without the mediacy of the MPEG encoders 112 and 122, the digital video input sections 113 and 123, and the MPEG decoders 120 and 121.

If, for example, address information written in the optical disk 119 cannot be read, the optical head 118 cannot be moved, i.e., sought, from a given recording area to another recording area on the optical disk 119. When such a seek failure occurs, the video disk apparatus of this embodiment repeats the seek up to a predetermined number of retries. Letting A (bps) be the bit rate of digital video data, S (sec) be the maximum access time for the optical disk 119 (the time obtained by adding the time required for one revolution of the optical disk 119 to the seek time required for the optical head 118 to move from the innermost circumference to the outermost circumference of the optical disk 119), and N be the maximum number of retries upon occurrence of a seek failure, the maximum seek time is set to (N+1)*S sec to estimate the read speed of the optical disk 119 and the capacities of the buffer memories 114 and 115 in consideration of retries upon occurrence of this seek failure.

If, therefore, the read speeds for the first and second digital video data are (T1+T2+2*S*(N+1))*A/T1 bps or more and (T1+T2+2*S*(N+1))*A/T2 bps or more, respectively, and the total storage capacity of the buffer memories 114 and 115 is (4*S*(N+1)+T1+T2)*A bits or more, the digital video data as re-seek targets can be stored in the buffer memories 114 and 115 even in the process of retrying seeking of the optical head 118, thereby allowing the digital video data to be read without any interruption.

In the above embodiment, the two-channel digital video data are simultaneously read. A case wherein three-channel digital video data are simultaneously read will be described next.

FIG. 12 shows changes in the digital video data in the buffer memories corresponding to the respective video images with time in the process of simultaneously reading the three video images. The three buffer memories are prepared for the respective video images. In addition, the average bit rate of the video data is set to A=4 Mbits/s; the maximum access time, S=0.2 sec; and T1=T2=T3, 0.6 sec.

The read speed required to simultaneously read the three video images is (T1+T2+T3+3*S) A/T1=16 Mbits/s or more. The capacity required for each buffer memory is (3*S+T1+T2)*A=7.2 Mbits. The total required capacity of three buffer memories 1, 2, and 3 is 7.2*3=21.6 Mbits. These three buffer memories 1, 2, and 3 respectively correspond to video images 1, 2, and 3.

(0) In the first 0.6-sec interval, video data 1 is read out from buffer 1 at a rate of 4 Mbits/s while video data 1 is read from the disk into buffer 1 at a rate of 16 Mbits/s. The amount of data in buffer 1 therefore becomes (16−4)*0.6= 7.2 Mbits.

Since no data is read from the disk into buffers 2 and 3, the amounts of data in these buffers remain 0 bit.

(1) In the next 0.2-sec interval, a seek is performed from the reproduction area for video data 1 to the reproduction area for video data 2. Video data 1 is read out from buffer 1 at a rate of 4 Mbits/s, and the amount of data in buffer 1 becomes 7.2 Mbits 4 Mbits/s*0.2=6.4 Mbits. The amounts of data in buffers 2 and 3 remain zero.

(2) In the next 0.6-sec interval, video data 2 is read out from buffer 2 at a rate of 4 Mbits/s while video data 2 is read from the disk into buffer 2 at a rate of 16 Mbits/s. The amount of data in buffer 2 therefore becomes (16−4)*0.6= 7.2 Mbits. Meanwhile, video data 1 is read out from buffer 1 at a rate of 4 Mbits/s. As a result, the amount of data in buffer 1 becomes 6.4 Mbits−4 Mbits/s*0.6=4 Mbits. The amount of data in buffer 3 remains zero.

(3) In the next initial 0.2-sec interval, a seek is performed from the reproduction area for video data 2 to the reproduction area for video data 3. Video data 1 and 2 are read out from buffers 1 and 2 at a rate of 4 Mbits/s. As a result, the amount of data in buffer 1 becomes 4 Mbits−4 Mbits/s*0.2= 3.2 Mbits, and the amount of data in buffer 2 becomes 7.2 Mbits−4 Mbits/s*0.2=6.4 Mbits.

(4) In the next 0.6-sec interval, video data 3 is read out from buffer 3 at a rate of 4 Mbits/s while video data 3 is read from the disk into buffer 3 at a rate of 16 Mbits/s. The amount of data in buffer 3 therefore becomes (16−4)*0.6= 7.2 Mbits. Meanwhile, video data 1 and 2 are read out from buffers 1 and 2 at a rate of 4 Mbits/s. As a result, the amount of data in buffer 1 becomes 3.2 Mbits 4 Mbits/s*0.6=0.8 Mbits, and the amount of data in buffer 2 becomes 6.4 Mbits−4 Mbits/s*0.6=4 Mbits.

(5) In the next initial 0.5-sec interval, a seek is performed from the reproduction area for video data 3 to the reproduction area for video data 1. Video data 1, 2, and 3 are respectively read out from buffers 1, 2, and 3 at a rate of 4 Mbits/s. As a result, the amounts of data in buffers 1, 2, and 3 respectively become 0.8 Mbits−4 Mbits/s*0.2=0 Mbit, 4 Mbits−4 Mbits/s*0.2=3.2 Mbits, and 7.2 Mbits−4 Mbits/ s*0.2=6.4 Mbits.

(6) In the next 0.6-sec interval, video data 1 is read out from buffer 1 at a rate of 4 Mbits/s while video data 1 is read from the disk into buffer 1 at a rate of 16 Mbits/s. The amount of data in buffer 1 therefore becomes (16−4)*0.6= 7.2 Mbits. Meanwhile, video data 2 and 3 are respectively read out from buffers 2 and 3 at a rate of 4 Mbits/s. As a result, the amount of data in buffer 2 becomes 3.2 Mbits−4 Mbits/s*0.6=0.8 Mbits, and the amount of data in buffer 3 becomes 6.4 Mbits−4 Mbits/s*0.6=4 Mbits.

(7) In the next initial 0.2-sec interval, a seek is performed from the reproduction area for video data 1 to the reproduction area for video data 2. Video data 1, 2, and 3 are respectively read out from buffers 1, 2, and 3 at a rate of 4 Mbits/s. As a result, the amounts of data in buffers 1, 2, and 3 respectively become 7.2 Mbits−4 Mbits/s*0.2=6.4 Mbits, 0.8 Mbits−4 Mbits/s*0.2=0 Mbit, and 4 Mbits−4 Mbits/ s*0.2=3.2 Mbits.

(8) In the next 0.6-sec interval, video data 2 is read out from buffer 2 at a rate of 4 Mbits/s while video data 2 is read from the disk into buffer 2 at a rate of 16 Mbits/s. The amount of data in buffer therefore becomes (16−4)*0.6=7.2 Mbits. Meanwhile, video data 1 and 3 are respectively read out from buffers 1 and 3 at a rate of 4 Mbits/s. As a result, the amounts of data in buffers 1 and 3 respectively become 6.4 Mbits−4 Mbits/s*0.6=4 Mbits and 3.2 Mbits−4 Mbits/ s*0.6=0.8 Mbits.

(10) In the next 0.6-sec interval, video data 3 is read out from buffer 3 at a rate of 4 Mbits/s while video data 3 is read from the disk into buffer 3 at a rate of 16 Mbits/s. The amount of data in buffer 3 therefore becomes (16−4)*0.6= 7.2 Mbits. Meanwhile, video data 1 and 2 are respectively read out from buffers 1 and 2 at a rate of 4 Mbits/s. As a result, the amounts of data in buffers 1 and 2 respectively become 3.2 Mbits−4 Mbits/s*0.6=0.8 Mbits and 6.4 Mbits−4 Mbits/s*0.6 4 Mbits. Subsequently, operations (5), (6), (7), (8), (9), and (10) are repeated.

In the process of reading each video data from the disk, in addition to video data corresponding to the read time, video data to be read in the time taken for three accesses and the time taken to read two remaining video data are read from the disk and stored in the corresponding buffer memory. The digital video data to be read is read out from the buffer memory in the interval during which three accesses are made and two remaining video data are read from the disk. By repeating these operations, the three digital video data are continuously read from the disk without any omission.

In addition, the conditions for the write/read speeds of a recording medium and a buffer capacity in a case wherein a maximum of N retries are performed upon occurrence of a seek failure may be set as follows when the maximum access time S is (N+1S) sec. In both the process of simultaneously writing three video data and the process of simultaneously reading three video data, the first write speed is set to (T1+T2+T3+3*S*(N+1))*A/T1 bps or more; the second read speed, (T1+T2+T3+3*S*(N+1))*A/T2 bps or more;

and the third read speed, $(T1+T2+T3+3*S*(N+1))*A/T2$ bps or more, and the total capacity of the read buffer memories is set to $(9*S*(N+1)+2*T1+2*T2+2*T3)*A$ bits or more.

In the above embodiment, two- and three-channel digital video data are simultaneously read from the disk. However, the present invention can also be applied to a simultaneous read of n-channel (n>3) digital video data.

In this case, n-channel digital video data are read from n recording areas located at different radial positions on an optical disk at T-sec intervals. Since n T-sec reads and n seeks (accesses) are performed in one time-divisional sequence, the required read speed is $(n*T+nS)*A/T$ bps or more, and the required buffer memory capacity is $(n*nS+nT)*A$ bits or more. As is obvious from the gist of the present invention, input n-channel digital video data can be read without any interruption under these conditions.

In the above simultaneous write of three video data and the above simultaneous read of three video data, the same write/read and buffer memory conditions are set. This means that a simultaneous read of three video data and a simultaneous write of three video data can be combined. A simultaneous write/read is disclosed in detail in Japanese Patent Application No. 9-66370. By applying this technique to the present invention, a simultaneous write/read operation can be performed by an arbitrary combination of a read of the video data and a write of three video data.

A write/read of m video data to which the present invention is applied will be described next.

Assume that the average bit rate of digital video data to be written or read is A bits/s, and the maximum access time for the optical disk (the time obtained by adding the time required for one revolution of the optical disk to the seek time required for the write/read head to move from the innermost circumference to the outermost circumference of the optical disk) is S sec. Consider a simultaneous write of m video data first. To simultaneously write m digital video data using one write/read head, the m video data must be time-divisionally written in the disk at a speed higher than the average bit rate of the m digital video data. Video data 1, video data 2, . . . , video data m are written in the disk in different time intervals. To process m video data, a write/read speed of $m*A$ bits/s is required for the disk. In addition, since the single optical head is used, and the positions of the respective recording areas on the optical disk are not necessarily the same, an access time is required to switch between writes in the respective recording areas. Assume that a write/read operation is performed by repeating the following time-divisional sequence: "T1-sec write"→"access from recording area 1 to recording area 2 in S sec"→"T2-sec write"→"access from recording area 2 to recording area 3 in S sec"→"T3-sec write"→"access from recording area 3 to recording area 4 in S sec"→"access from recording area m−1 to recording area m in S sec"→"Tm-sec write"→"access from recording area m to recording are 1". In this case, m accesses are performed in one time-divisional sequence.

When the first video image is to be written, therefore, the digital video data input in $(T1+T2+T3+ \ldots +Tm+m*S)$ sec is written in the disk in T1 sec. Consequently, the write speed for the first video image is $(T1+T2+T3+ \ldots +Tm+m*S)*A/T1$ bps or more. Similarly, the write speed for the second video image is $(T1+T2+T3+ \ldots +Tm+m*S)*A/T2$ bps or more; the write speed for the third video image, $(T1+T2+T3+ \ldots +Tm+m*S)*A/T3$ bps or more, . . . ; and the write speed for the mth video image, $(T1+T2+1+ \ldots +Tm+m*S)*A/Tm$ bps or more.

The required buffer memory capacity is the value obtained by multiplying the sum of m times the access time (the time required for the optical head to reciprocate between recording area 1, recording area 2, recording area 3, . . . , recording area m) and the time required to write the (m−1) remaining video images by the average transfer rate of the video images. The respective buffer memory capacities required for the first to mth video images are: $(m*S+T2+T3+ \ldots +Tm)A$ bits or more for the first video image; $(m*S+T1+T3+T4+ \ldots +Tm)*A$ bits or more for the second video image; $(m*S+T1+T2+T4+ \ldots +Tm)*A$ bits or more for the third video image; and $(m*S+T1+T2+T3+ \ldots +Tm-1)*A$ bits or more for the mth video image.

A total of $(m*m*S+(m-1)(T1+T2+T3+ \ldots +Tm))*A$ bits or more is required. If these conditions for the write/read speed of the disk and the buffer capacities are satisfied, the digital video image to be written is stored in each buffer memory while m accesses are made and (m−1) remaining video images are written in the disk. The video data in each buffer memory is written in the disk in a corresponding write interval. By repeating these operations, the transferred digital video data are continuously written in the optical disk without any omission.

The above description concerns a write operation. As is obvious, however, the conditions for the read speed of data from the disk and the read buffer memories are the same as those for the write operation.

In the process of reading each video data from the disk, in addition to video data corresponding to the read time, video data to be read in the time taken for m accesses and the time taken to read (m−1) remaining video data are read from the disk and stored in the corresponding buffer memory. The digital video data to be read is read out from the buffer memory in the interval during which m accesses are made and (m−1) remaining video data are read from the disk. By repeating these operations, the m digital video data are continuously read from the disk without any omission. In addition, the conditions for the write/read speeds of a recording medium and a buffer capacity in a case wherein a maximum of N retries are performed upon occurrence of a seek failure may be set as follows when the maximum access time S is (N+1) sec. In both the process of simultaneously writing three video data and the process of simultaneously reading three video data, the first write speed is set to $(T1+T2+T3+ \ldots +Tm+m*S*(N+1))*A/T1$ bps or more; the second read speed, $(T1+T2+T3+ \ldots +Tm+m*S*(N+1))*A/T2$ bps or more; the third read speed, $(T1+T2+T3+ \ldots +Tm+m*S*(N+1))*A/T3$ bps or more, . . . ; the mth read speed, $(T1+T2+T3+ \ldots +Tm+m*S*(N+1))*A/Tm$ bps or more, and the total capacity of the write buffer memories is set to $(m*m*S*(N+1)+(m-1)*(T1+T2+T3+ \ldots +Tm)*A$ bits or more.

In the above simultaneous write of m video data and the above simultaneous read of m video data, the same write/read and buffer memory conditions are set. This means that a simultaneous read of three video data and a simultaneous write of m video data can be combined. A simultaneous write/read is disclosed in detail in Japanese Patent Application No. 9-66370. By applying this technique to the present invention, a simultaneous write/read operation can be performed by an arbitrary combination of a read of the video data and a write of m video data.

In this embodiment, semiconductor memories on different chips may be used as the first and second buffer memories 114 and 115. Alternatively, a large-capacity semiconductor memory on one chip may be divided into two address spaces, and the first and second digital video data may be respectively stored in the two addresses spaces.

As described above, according to the present invention, digital video data on a plurality of channels can be written in one video disk apparatus without degrading image quality by alternately and time-divisionally writing different digital video data in a plurality of recording areas located at different radial positions on a disk-like recording medium using a single write/read head.

More specifically, in the present invention, the write speed of the recording medium is set to higher than the bit rate obtained by adding the access time required for the write/read head to reciprocate between the first and second recording areas to the total bit rate of the first and second digital video data. In addition, the recording system for the first digital video data includes the first buffer memory having a capacity enough to store the first digital video data input in the interval during which the second digital video data is written and the write/read head reciprocates (accesses) between the first and second recording areas. The recording system for the second digital video data includes the second buffer memory having a capacity enough to store the second digital video data input in the interval during which the first digital video data is written and the write/read head reciprocates (accesses) between the first and second recording areas. With this arrangement, the first and second digital video data can be continuously and simultaneously written in the recording medium by the single write/read head without any omission.

In the above embodiments, an optical disk is used as a recording medium. However, the present invention can be theoretically applied to any apparatus designed to write/read data on/from a disk-like recording medium by using a write/read head, e.g., a magnetic disk apparatus (hard disk apparatus) or a floppy disk apparatus.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined in the appended claims and their equivalents.

What is claimed is:

1. A disk apparatus using a disk-like recording medium having a plurality of different recording areas located at different radial positions, comprising:
   a head unit configured to write digital continuous data in the disk-like recording medium;
   a buffer memory configured to temporarily store a plurality of input digital continuous data; and
   a control device configured to control the head unit and buffer memory to time-divisionally write the plurality of digital continuous data in the plurality of different recording areas of the recording medium,
      wherein said control device writes, while one group of data of the digital continuous data is written in one of the plurality of different recording areas at a write speed not less than two times an average bit rate of the input digital continuous data and said head unit is accessing between the recording areas, another group of data of the digital continuous data in said buffer memory, and
      writes, in said buffer memory, said one group of data of the digital continuous data input while said another group of data of the digital continuous data that is stored in the buffer memory is read out therefrom and written into another one of the recording areas at a write speed not less than two times an average bit rate of the input digital continuous data and said head unit is accessing between the recording areas.

2. An apparatus according to claim 1, wherein the digital continuous data includes first and second digital video data, said recording medium includes first and second recording areas, and said control device performs write control by setting a write speed for the first digital video data to not less than $(T1+T2+2*S)*A/T1$ bps and a write speed for the second digital video data to not less than $(T1+T2+2*S)*A/T2$ bps when an average write time per write of the first digital video data is T1 sec in time-divisionally and alternately writing the first and second digital video data in said first and second recording areas, an average write time per write of the second digital video data is T2 sec, a maximum access time representing a time obtained by adding a time required for one revolution of said recording medium to a seek time required for said head unit to move from an innermost circumference to an outermost circumference of said recording medium is S sec, and an average bit rate of the first and second input digital video data is A bps.

3. An apparatus according to claim 1, wherein the digital continuous data includes first and second digital video data, said recording medium includes first and second recording areas, and said control device performs write control by setting a total storage capacity of the buffer memory to not less than $(4*S+T1+T2)*A$ bits when an average write time per write of the first digital video data is T1 sec in time-divisionally and alternately writing the first and second digital video data in said first and second recording areas, an average write time per write of the second digital video data is T2 sec, a maximum access time representing a time obtained by adding a time required for one revolution of said recording medium to a seek time required for said head unit to move from an innermost circumference to an outermost circumference of said recording medium is S sec, and an average bit rate of the first and second input digital video data is A bps.

4. An apparatus according to claim 1, wherein the digital continuous data includes first and second digital video data, said recording medium includes first and second recording areas, and said control device performs write control by setting a write speed for the first digital video data to not less than $(T1+T2+2*S*(N+1))*A/T1$ bps, and a write speed for the second digital video data to not less than $(T1+T2+2*S*(N+1))*A/T2$ bps when an average write time per write of the first digital video data is T1 sec in time-divisionally and alternately writing the first and second digital video data in said first and second recording areas, an average write time per write of the second digital video data is T2 sec, a maximum access time representing a time obtained by adding a time required for one revolution of said recording medium to a seek time required for said head unit to move from an innermost circumference to an outermost circumference of said recording medium is S sec, an average bit rate of the first and second input digital video data is A bps, and a maximum number of retries upon occurrence of a seek failure is N.

5. An apparatus according to claim 1, wherein the digital continuous data includes first and second digital video data, said recording medium includes first and second recording areas, said buffer memory includes first and second buffer memory areas for temporarily storing the first and second digital video data, respectively, and said control device performs write control by setting a total storage capacity of said first and second buffer memory areas to $(4*S*(N+1)+T1+T2)*A$ bits when an average write time per write of the first digital video data is T1 sec in time-divisionally and alternately writing the first and second digital video data in said first and second recording areas, an average write time per write of the second digital video data is T2 sec, a maximum access time representing a time obtained by adding a time required for one revolution of said recording medium to a seek time required for said head unit to move from an innermost circumference to an outermost circumference of said recording medium is S sec, an average bit rate of the first and second input digital video data is A bps, and a maximum number of retries upon occurrence of a seek failure is N.

6. An apparatus according to claim 1, further comprising a display unit configured to simultaneously display the plurality of digital continuous data written in said recording areas as a plurality of images.

7. An apparatus according to claim 1, wherein the digital continuous data includes first, second, and third digital video data, said recording medium includes first, second, and third recording areas, and said control device performs write control by setting a write speed for the first digital video data to not less than $(T1+T2+T3+3*S)*A/T1$ bps, a write speed for the second digital video data to not less than $(T1+T2+T3+3*S)*A/T2$ bps, a write speed for the third digital video data to not less than $(T1+T2+T3+3*S)*A/T3$ bps when an average write time per write of the first digital video data is T1 sec, an average write time per write of the second digital video data is T2 sec, an average write time per write of the third digital video data is T3 sec, a maximum access time representing a time obtained by adding a time required for one revolution of said recording medium to a seek time required for said head unit to move from an innermost circumference to an outermost circumference of said recording medium is S sec, and an average bit rate of the input digital video data is A bps.

8. An apparatus according to claim 1, wherein said control section performs write control by setting a write speed for the first digital video data to not less than $(T1+T2+T3+3*S*(N+1))*A/T1$ bps, a write speed for the second digital video data to not less than $(T1+T2+T3+3*S*(N+1))*A/T2$ bps, and a write speed for the third digital video data to not less than $(T1+T2+T3+3*S*(N+1))*A/T3$ bps when a maximum number of retries upon occurrence of a seek failure is N.

9. A disk apparatus using a disk-like recording medium having a plurality of different recording areas located at different radial positions, comprising:

a head unit configured to read digital continuous data from the disk-like recording medium;

a buffer memory configured to temporarily store a plurality of digital continuous data read from the plurality of recording areas of said recording medium; and a control device configured to control said head unit to time-divisionally and alternately read the digital continuous data, wherein said control device reads the digital continuous data from one of said recording areas in advance at a read speed not less than two times an average bit rate of the digital continuous data and writes the data in said buffer memory while one group of data of the digital continuous data is read from said buffer memory at the bit rate of the digital continuous data and said head unit is accessing between said recording areas, and reads the digital continuous data from one of said recording areas in advance at a read speed not less than two times the average bit rate of the digital continuous data and writes the data in said buffer memory while another group of data of the digital continuous data is read from said buffer memory at the bit rate of the digital continuous data and said head unit is accessing between said recording areas.

10. An apparatus according to claim 9, wherein the digital continuous data includes first and second digital video data, said recording medium includes first and second recording areas, and said control device performs read control by setting a read speed for the first digital video data to not less than $(T1+T2+2*S)*A/T1$ bps, and a read speed for the second digital video data to not less than $(T1+T2+2*S)*A/T2$ bps when an average read time per read of the first digital video data is T1 sec in time-divisionally and alternately reading the first and second digital video data from said first and second recording areas, an average read time per read of the second digital video data is T2 sec, a maximum access time representing a time obtained by adding a time required for one revolution of said recording medium to a seek time required for said head unit to move from an innermost circumference to an outermost circumference of said recording medium is S sec, and an average bit rate of the first and second input digital video data is A bps.

11. An apparatus according to claim 9, wherein the digital continuous data includes first and second digital video data, said recording medium includes first and second recording areas, and said control device performs read control by setting a total storage capacity of said buffer memory to not less than $(4*S+T1+T2)*A$ bits when an average read time per read of the first digital video data is T1 sec in time-divisionally and alternately reading the first and second digital video data from said first and second recording areas, an average read time per read of the second digital video data is T2 sec, a maximum access time representing a time obtained by adding a time required for one revolution of said recording medium to a seek time required for said head unit to move from an innermost circumference to an outermost circumference of said recording medium is S sec, and an average bit rate of the first and second input digital video data is A bps.

12. An apparatus according to claim 9, wherein the digital continuous data includes first and second digital video data, said recording medium includes first and second recording areas, and said control device performs read control by setting a read speed for the first digital video data to not less than $(T1+T2+2*S*(N+1))*A/T1$ bps, and a read speed for the second digital video data to not less than $(T1+T2+2*S*(N+1))*A/T2$ bps when an average read time per read of the first digital video data is T1 sec in time-divisionally and alternately reading the first and second digital video data from said first and second recording areas, an average read time per read of the second digital video data is T2 sec, a maximum access time representing a time obtained by adding a time required for one revolution of said recording medium to a seek time required for said head unit to move from an innermost circumference to an outermost circumference of said recording medium is S sec, an average bit rate of the first and second input digital video data is A bps, and a maximum number of retries upon occurrence of a seek failure is N.

13. An apparatus according to claim 9, wherein the digital continuous data includes first and second digital video data, said recording medium includes first and second recording areas, and said control device performs read control by setting a total storage capacity of said buffer memory to $(4*S*(N+1)+T1+T2)*A$ bits when an average read time per read of the first digital video data is T1 sec in time-divisionally and alternately reading the first and second digital video data from said first and second recording areas, an average read time per read of the second digital video data is T2 sec, a maximum access time representing a time obtained by adding a time required for one revolution of said recording medium to a seek time required for said head unit to move from an innermost circumference to an outermost circumference of said recording medium is S sec, an average bit rate of the first and second input digital video data is A bps, and a maximum number of retries upon occurrence of a seek failure is N.

14. An apparatus according to claim 9, further comprising a display unit configured to simultaneously display the plurality of digital continuous data read from said recording areas as a plurality of images.

15. An apparatus according to claim 9, wherein the digital continuous data includes first, second, and third digital video data, said recording medium includes first, second, and third recording areas, and said control device performs read control by setting a read speed for the first digital video data to not less than $(T1+T2+T3+3*S)*A/T1$ bps, a read speed for the second digital video data to not less than $(T1+T2+T3+3*S)*A/T2$ bps, a read speed for the third digital video data to not less than $(T1+T2+T3+3*S)*A/T3$ bps when an average read time per read of the first digital video data is T1 sec, an average read time per read of the second digital video data is T2 sec, an average read time per read of the third digital video data is T3 sec, a maximum access time representing a time obtained by adding a time required for one revolution of said recording medium to a seek time required for said head unit to move from an innermost circumference to an outermost circumference of said recording medium is S sec, and an average bit rate of the input digital video data is A bps.

16. An apparatus according to claim 9, wherein said control device performs read control by setting a read speed for the first digital video data to not less than $(T1+T2+T3+3*S*(N+1))*A/T1$ bps, a read speed for the second digital video data to not less than $(T1+T2+T3+3*S*(N+1))*A/T2$ bps, and a read speed for the third digital video data to not less than $(T1+T2+T3+3*S*(N+1))*A/T3$ bps when a maximum number of retries upon occurrence of a seek failure is N.

17. An apparatus according to claim 9, wherein the digital continuous data includes first, second, and third digital video data, said recording medium includes first, second, and third recording areas, said buffer memory includes first, second, and third buffer memory areas configured to temporarily store the first, second, and third digital video data, respectively, and said control section performs read control by setting a total capacity of said first, second, and third buffer memory areas to not less than $(9*S+2*T1+2*T2+2*T3)*A$ bits when an average read time per read of the first digital video data is T1 sec, an average read time per read of the second digital video data is T2 sec, an average read time per read of the third digital video data is T3 sec, a maximum access time representing a time obtained by adding a time required for one revolution of said recording medium to a seek time required for said head unit to move from an innermost circumference to an outermost circumference of said recording medium is S sec, and an average bit rate of the input digital video data is A bps.

18. An apparatus according to claim 17, wherein the total capacity of said first, second, and third buffer memory areas is set to not less than $(9*S*(N+1)+2*T1+2*T2+2*T3)*A$ bits when a maximum number of retries upon occurrence of a seek failure is N.

19. An apparatus according to claim 9, wherein the digital continuous data includes first, second, and third digital video data, said recording medium includes first, second, and third recording areas, said buffer memory includes first, second, and third buffer memory areas configured to temporarily store the first, second, and third digital video data, respectively, and said control section performs read control by setting a total capacity of said first, second, and third buffer memory areas to not less than $(9*S+2*T1+2*T2+2*T3)*A$ bits when an average read time per read of the first digital video data is T1 sec, an average read time per read of the second digital video data is T2 sec, an average read time per read of the third digital video data is T3 sec, a maximum access time representing a time obtained by adding a time required for one revolution of said recording medium to a seek time required for said head unit to move from an innermost circumference to an outermost circumference of said recording medium is S sec, and an average bit rate of the input digital video data is A bps.

20. An apparatus according to claim 19, wherein said control section performs read control by setting the total capacity of said first, second, and third buffer memory areas to not less than $(9*S*(N+1)+2*T1+2*T2+2*T3)*A$ bits when a maximum number of retries upon occurrence of a seek failure is N.

* * * * *